US008262450B1

(12) United States Patent
Lubin

(10) Patent No.: US 8,262,450 B1
(45) Date of Patent: Sep. 11, 2012

(54) NON-COMMISSION PAI GOW POKER GAMES, DEVICES, SYSTEMS AND METHODS THEREOF

(75) Inventor: Daniel C. Lubin, Las Vegas, NV (US)

(73) Assignee: Lubin-Jones, LLC, Las Vegas, NV (US)

( * ) Notice: Subject to any disclaimer, the term of this patent is extended or adjusted under 35 U.S.C. 154(b) by 385 days.

(21) Appl. No.: 12/498,341

(22) Filed: Jul. 6, 2009

Related U.S. Application Data

(60) Provisional application No. 61/137,597, filed on Aug. 1, 2008, provisional application No. 61/200,126, filed on Nov. 25, 2008.

(51) Int. Cl.
*A63F 1/00* (2006.01)
*A63F 13/00* (2006.01)

(52) U.S. Cl. ........................ 463/13; 273/292; 273/138.2

(58) Field of Classification Search .................. 273/292, 273/274, 309, 138.2, 143 R; 463/13
See application file for complete search history.

(56) References Cited

U.S. PATENT DOCUMENTS

| | | | | |
|---|---|---|---|---|
| 6,007,424 | A | 12/1999 | Evers et al. | |
| 6,135,453 | A | 10/2000 | Srichayaporn | |
| 6,270,078 | B1 | 8/2001 | Leone et al. | |
| 6,491,302 | B1 | 12/2002 | Boylan et al. | |
| 6,631,906 | B1 | 10/2003 | Timpano | |
| 6,702,289 | B1 | 3/2004 | Feola | |
| 6,793,220 | B1 | 9/2004 | Feola | |
| 2008/0099996 | A1* | 5/2008 | Webb | 273/292 |
| 2010/0222122 | A1* | 9/2010 | Vang et al. | 463/11 |
| 2010/0244381 | A1* | 9/2010 | Chan | 273/292 |

* cited by examiner

*Primary Examiner* — Benjamin Layno
(74) *Attorney, Agent, or Firm* — Howard & Howard Attorneys PLLC

(57) ABSTRACT

Methods of playing commission-free pai gow poker games are disclosed. The commission-free pai gow poker games have multiple features, including a novel push mechanism and a novel copy-fostering mechanism, that provide a gaming establishment with an adequate house edge without the need to charge a commission on player wins. The features of the commission-free pai gow poker games may be incorporated in one or more instruction sets or software configured in one or more mechanical devices and/or electronic devices. Furthermore, the features may be configured in one or more displays in communication with one or more servers as desired. Furthermore, the commission-free pai gow poker games may be offered in a non-gaming media environment as desired.

9 Claims, 20 Drawing Sheets

Continued to Fig. 1B

From Fig. 1A

NON-COMMISSION PAI GOW POKER GAMES, DEVICES, SYSTEMS AND METHODS THEREOF

CROSS-REFERENCE TO RELATED APPLICATION

This application Claims the Priority Date of U.S. Provisional Application No. 61/137,597, filed Aug. 1, 2008, entitled "Advantage Pai Gow Poker, Commission-Free Pai Gow Poker for Casino House Use" and U.S. Provisional Patent Application No. 61/200,126, filed Nov. 25, 2008, entitled "Tao Pai Gow Poker, Commission-Free Pai Gow Poker for Casino House Use" with the same inventor being named.

FIELD OF THE INVENTION

This invention generally relates to games and gaming devices, and more specifically, to improved pai gow poker games, devices and systems with preselected or commission-free structures for one or more gaming establishments to provide improved earnings and speed of play of the games while enhancing players' entertainment experience.

BACKGROUND OF THE INVENTION

Pai gow is an Asian game based on the use of tiles arranged by each player into a two-tile high side and a two-tile low side, looking for higher ranking on each side of the two sides. The two-sided hand configuration has since been adapted to poker to create the game of pai gow poker.

Pai gow poker uses a 53-card deck consisting of a standard 52-card deck plus a joker. The joker card used in standard pai gow poker is a "bug" card, as opposed to a wild card, meaning that it can only act as a fill-in card to complete a straight, a flush or a straight flush, or otherwise acts as the fifth ace when not used in a straight, a flush or a straight flush. However, in some localities, such as Southern California, a version of pai gow poker using a completely wild joker card is prevalent.

Players are dealt a seven-card hand that they arrange into a "short" side comprising two playing cards and a "long" side comprising five playing cards. The rules of standard poker define the ranking of hands. In yet another rule, the long side must have a higher poker ranking than the short side. If a player disobeys this rule, the player's hand is considered to be a foul, leading to the forfeiture of any wager. Typically, a gaming establishment has a set of rules mandating how its dealers must arrange their pai gow poker hands, known as the "house way."

The player's hand faces the dealer's hand. Where the players elect to bank against one another and, thus, finance the action against one another, the player's hand faces the banker's hand. In order to win, a player must have a short side and a long side that both beat the ranking of the banker's short side and long side (for purposes of simplicity, the discussion mostly assumes the banker is a dealer acting on behalf of a gaming establishment, also referred to here as the "house"). If the ranking of one of the player's two sides is identical to the ranking of the banker's corresponding side, an occurrence known as a "copy," the house wins if the other side of the house's hand has a higher ranking than that of the player's corresponding side. If the player has just one side of higher ranking than the banker's corresponding side, an occurrence known as a "push," then neither the house nor the player win.

When played as per the rules described above, pai gow poker is close to being a 50/50 game of chance. For this reason, casinos must charge a commission, generally 5%, against player wins in order to create a house edge covering their costs of operation (where a player is the banker, a 5% commission is generally charged against all player net winnings). The need to charge a commission in order to have an adequate house edge is naturally a drawback to the game of pai gow poker. It makes the game appear more overtly unfavorable to players, resulting in player dissatisfaction and avoidance of the game by potential players. Moreover, the time lost in calculating commissions is taken away from play, resulting in loss of revenue to casinos who, in principle, experience increased revenue from increased play. Also, the need for dealers to stop play in order to calculate commissions distracts them, resulting in increased dealer errors during play, thus reducing casino yields. Finally, the need to calculate commissions inevitably results in dealer miscalculations. To the extent such dealer miscalculations are in favor of players, the house loses revenue directly. To the extent such dealer miscalculations are in favor of the house, they risk provoking player dissatisfaction and mistrust. The prior art fails to disclose a pai gow poker game overcoming the need for a gaming establishment to charge the standard house commission on player winnings that pays even money on player wins.

Another problem endemic to pai gow poker is the relatively slow pace of the game. Since many pai gow poker hands are pushes where neither side wins, it will be appreciated that a pai gow poker game may go on for a long time without any exchange of money (action) occurring. From a gaming establishment's standpoint, such time equates to lost revenue, and it would be generally desirable to increase the speed of play.

In view of the foregoing, some gaming establishments offer altered pai gow games with altered proposition bets designed to boost casino earnings. The following disclosures comprise some of these pai gow poker game variations.

U.S. Pat. No. 6,007,424 to Evers et al. discloses a pai gow poker game method and device (machine version). Though Evers et al. alter standard pai gow poker rules to make the game more stimulating for players, for example, by providing increased jackpots, they do not improve the game by eliminating the standard house commission on player winnings.

U.S. Pat. No. 6,135,453 to Srichayaporn discloses a method and apparatus for playing a high/low poker game in certain gaming jurisdictions, such as tribal reservations, where "dealer bank" games are not allowed. Srichayaporn seeks to overcome this problem, but does not disclose a method of play directed to enabling the elimination of standard house commissions on player winnings.

Leone et al., U.S. Pat. No. 6,270,078 B1, disclose a method for playing an improved version of pai gow poker which alters the rules by allowing a player to play against the house even when another player is acting as the banker. Leone et al. do nothing, however, to enable the elimination of the standard house commission on player winnings.

U.S. Pat. No. 6,491,302 B1 to Boylan et al. discloses a modified pai gow poker game using tie-breaker cards to overcome pushes. However, Boylan et al. do nothing to enable the elimination of the standard house commission on player winnings.

U.S. Pat. No. 6,631,906 B1 to Timpano discloses a supplemental wager pai gow poker game that extends wagers to each of the short and long sides of players' hands, but fails to enable the elimination of the standard house commission on player winnings.

U.S. Pat. No. 6,702,289 B1 to Feola discloses a pai gow poker game of chance using a random number generator to determine who receives the first hand of a game, and offering a side bet (proposition bet) regarding who gets that first hand. U.S. Pat. No. 6,793,220 B1 to Feola discloses a pai gow poker game of chance with bonuses (different proposition bets) on partial hands. Both of these patents to Feola seek to increase interest in pai gow poker play, but neither invention enables the elimination of the standard house commission on player winnings.

U.S. Patent Application Publication 2008/0099996 to Webb claims to provide for a version of "no commission" pai gow poker. However, in reality, Webb utilizes a commission structure by altering payouts to less than even money to take the place of a formal commission charge. This approach to "elimination" of the standard house commission on player winnings is entirely dissimilar to the approach of the instant disclosure, which relies on a push mechanism as explained in detail below.

It can thus be seen that there is a need for an improved pai gow poker game enabling gaming establishments to eliminate the standard house commission on player winnings while maintaining their house edge, along with methods of play, tangible aids to foster efficient and enjoyable play of the game, and embodiments in gaming machines, play over computer networks and tournament play.

SUMMARY OF THE INVENTION

The current disclosure provides an improved, non-commission pai gow poker game (the "Game") that effectively enables a gaming establishment to overcome the need to charge the standard house commission on player winnings in order to maintain an acceptable house edge. As shown in detail below, this is accomplished by altering the rules of traditional pai gow poker to convert specified hand combinations that would otherwise be treated as player wins, and treating them instead as pushes. The push mechanism may be set at different levels (i.e., constraint conditions/rule changes) providing different improvements in the house edge, and may be combined with a mathematically-proven approach to superior house ways to increase the number of copies inuring to the benefit of the house. The invention accomplishes the elimination of the need to charge a standard house commission in a manner that is minimally intrusive to play and player expectations, because the rule changes used to effect the push mechanism were carefully selected by the inventor based on their statistical rarity, yet adequacy to maintain the house edge in a non-commission environment. In all cases, the Game pays even money (i.e., the full amount wagered) on player winnings. This is in contrast, for example, to the Webb disclosure cited above. The invention further accomplishes its purpose by increasing the speed of play, since the pushes fostered by the recommended rule changes come in lieu of win/lose rounds of play that simply cancel each other out, but which must be accounted by the dealer.

The current disclosure provides for the Game in formats suitable for play both in gaming jurisdictions where the standard bug joker is used, as well as where the fully wild joker is used; where a player is the banker; where the Game is offered in a machine embodiment; where the Game is offered over a computer network; and where the Game is offered for tournament play. The current disclosure further provides for instructional aids, and for a mechanical wheel device enabling dealers to more effectively and efficiently implement the methods of the Game or other playing card-based casino table games during live play.

The foregoing and other articles, features and advantages of the invention will be apparent from the following more detailed description of the preferred embodiments of the invention, as illustrated in the accompanying drawings. The various features may be utilized or claimed alone or in any combination.

DESCRIPTION OF THE INVENTION

Figure 1A:
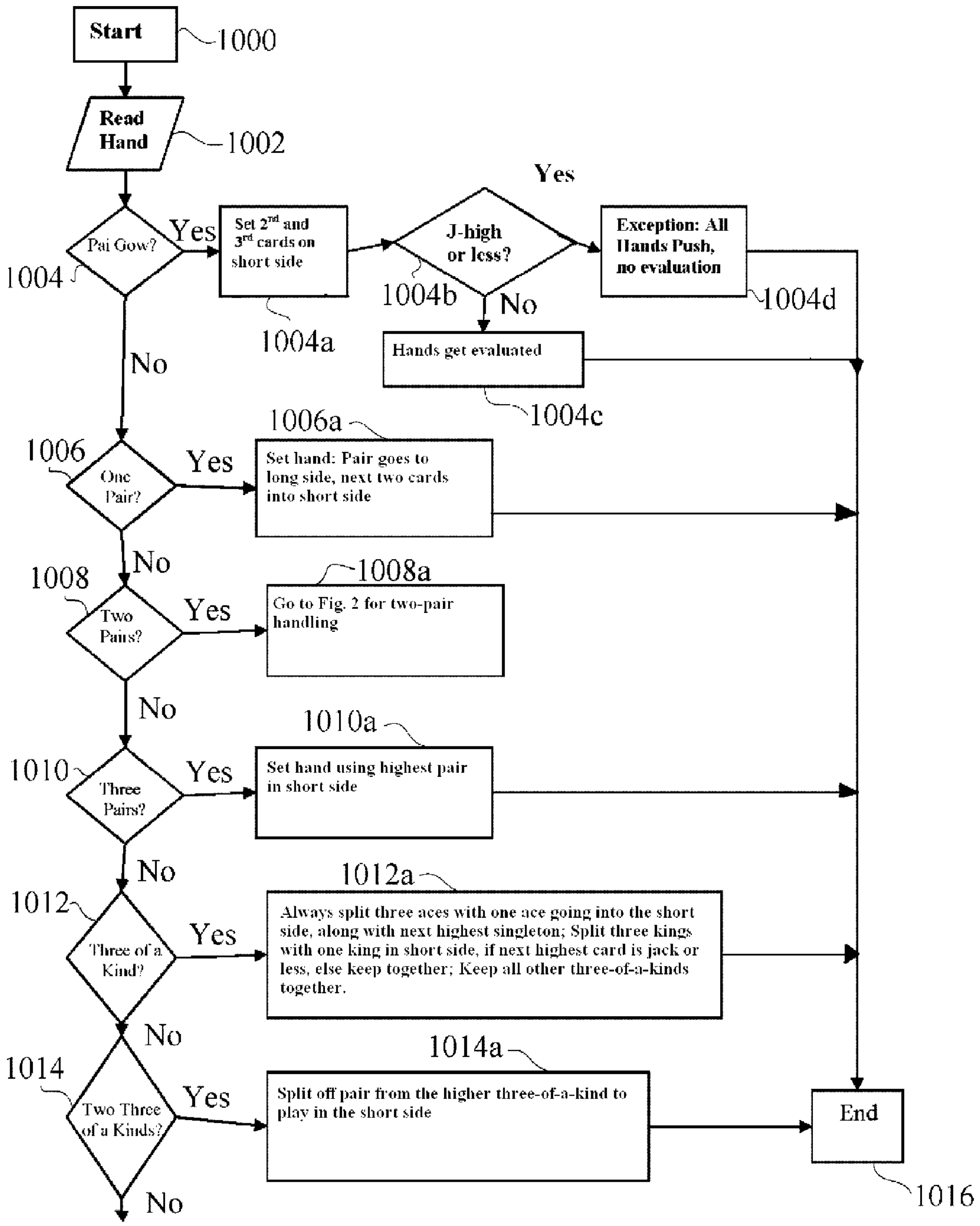
FIG. 1A depicts a portion of a flow diagram indicating steps in the method of the Game as embodied in an exemplary house rule set.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In the Summary above, the Description of the Invention, and the Claims and Abstract below, reference may be made to particular features (including method steps) of the invention. It is to be understood that this disclosure includes possible combinations of such particular features. For example, where a particular feature is disclosed in the context of a particular aspect or embodiment of the invention, or a particular claim, that feature may also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B and C can consist of (i.e., contain only) components A, B and C, or can contain not only components A, B and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number or the indefinite article "a" (meaning "one") is used herein to denote the start of a range beginning with that number (which may be a range having an upper limit or no upper limit, depending on the variable being defined). For example "at least one" or "at least a" means 1 or more than 1. The term "at most" followed by a number is used herein to denote the end of a range ending with that number (which may be a range having 1 or 0 as its lower limit or a range having no lower limit, depending upon the variable being defined). For example, "at most 4" means 4 or fewer than 4, and "at most 40%" means 40% or less than 40%. If, in this disclosure, a range is given as "(a first number) to (a second number)" or "(a first number)-(a second number)," this means a range whose lower limit is the first number and whose upper limit is the second number. For example, 0-10 mm means a range whose lower limit is 0 mm, and whose upper limit is 10 mm.

The term "at least" as denoted herein means one or more, while the term a "plurality" means two or more.

The term "or" is used herein as a conjunction used to link alternatives in a series of alternatives. The term "and/or" is used herein as a conjunction meaning that either or both of two options may be valid.

The term "and" is used herein as a conjunction to indicate an additional thing situation or fact.

When used in the appended claims, the term "comprising at least one of A and B" as used herein (depending on the context of the specification) may mean: comprising either one of A or of B (and more), or comprising both of A and of B (and more). As is understood in the patent art, "comprising A" means "A and more," while "comprising B" means "B and more." Thus if A is excluded according to the context of the specification in the phrase "comprising at least one of A and B," then A cannot be part of the "and more" and similarly for B if B is excluded according to the context of the specification.

Technical Terminology

The following technical terms which are commonly understood by a person skilled in the art may be used in this disclosure regarding pai gow poker:

Designations of playing cards: In the context of the current disclosure, when used to describe a playing card's rank without regard to the suit of the playing card, A=ace, K=king, Q=queen, J=jack, 10, 9, 8, 7, 6, 5, 4, 3, 2=the number card indicated by the number, and x=a low value card whose rank is immaterial to the hand illustrated. Further, a joker playing card may be designated using the symbol * as a wild card within the game's established usage for that wild card. As explained above, pai gow poker may be played with the wild card acting as a bug card or, alternatively, as a completely wild card. The wild card may have a value designated by a player receiving the wild card within the constraints of applicable playing conventions.

Ranking order of pai gow poker hands: The following lists the ranking order of five-card long sides, from highest to lowest, generally used by casinos in the United States:

1. Five aces (including the joker)
2. Royal flush
3. Straight flush
4. Four-of-a-kind
5. Full house
6. Flush
7. Straight (note: the highest straight is A, K, Q, J, 10; in pai gow poker, the second highest straight is A, 2, 3, 4, 5 (which is also the second highest straight flush if suit ranks are considered, with spades, hearts, diamonds and clubs being the highest to lowest suit ranks))
8. Three-of-a-kind
9. Two pairs
10. One pair
11. High card (called a "pai gow hand")

It is understood that when the designation given above indicates "three-of-a-kind," then the remaining cards may also make up high cards (called "kicker cards") that are not part of the three-of-a-kind. It may thus be seen that there are multiple ways to arrange the playing cards on the long side of a pai gow poker hand according to the ranking list above (see also "Designation of Playing Cards" above regarding use of a joker).

When the long side of the pai gow poker hand comprises fewer than five playing cards, certain of the designated poker elements may be reduced to a lower set of cards. Thus, in a four-card long side, four aces may have the highest ranking followed by a royal flush (A, K, Q, J of same suit), and there may be no full house, and so on. In a three-card long hand, a straight flush or a royal flush (A, K, Q of same suit) may have the highest ranking, and there may be no full house, no two-pair hands, and so on. As understood in the art, any pai gow poker hand devoid of the designations 1 to 11 listed above would be considered to have no poker elements.

Main bet, or the bet on the hand: The main wager on the play of the hand against the dealer or banker.

Proposition bet: Any side bet included in the game apart from the main bet. Proposition bets include bonus bets, insurance/protection bets and dealer push ("dragon") bets.

Bonus bet: A separate bet that the hand dealt will contain a poker element of three-of-a-kind or stronger. Typically, a bonus bet may pay off at various rates, depending on the strength of the poker element, generally 2:1 for a straight, up to 5000:1 for a natural seven-card straight flush. For example, currently, the bonus bet amount in a USA-based gaming establishment may range from $1 to $25, although it would be understood that this could be varied.

Insurance bet or protection bet: A bet that the player will receive a dealt hand that has no poker elements in it aside from high card singletons. This bet serves to give some return to a player who was dealt a poor hand.

Dealer push ("dragon") bet: A bet that the dealer will push the main bet under the rules of the game as it is being played.

Layout or felt: A cloth covering of a gaming table, which reveals the betting spaces and card placements that are specific to a particular game to be played, so that dealers and players can visibly be on the "same game program" as they play that specific game. Without limiting the disclosure, the layout or felt may comprise a game's trademark, name of an issuing organization (in other words the trademark holder) and location, and one or more utility patent numbers, design patent numbers or pending patent application numbers for all proprietary table games offered on the felt. Further, the layout may have some general instructions such as "Bonus Bet," "Insurance Bet," and "Main Bets Push On Dealer's Jack-High Or Less," etc. The layout may further comprise a gaming license number for a specific state's gaming jurisdiction.

Player banking: Players may "bank" certain hands against other players. A player electing to bank is asked to finance the wins and losses of his hand played directly against other players.

Pai gow hand: A hand that lacks any poker element of strength other than the value of individual singleton cards.

1. Methods of Playing Pai Gow Poker Games

A. Current State of the Art with Respect to House Edge in Pai Gow Poker

Currently, the house edge available from casino pai gow poker games derives from two sources: (1) the fact that copies are won by the house; and (2) the standard house commission of 5% on player winnings.

In regard to copies, using a standard house way, they occur with a frequency of about once in every 40 hands. This amounts to a 2.5% occurrence ratio, with a theoretical net yield of 1.25% (because pai gow poker has a two-sided hand, both of which must prevail (copy on one side plus a higher rank on the other side) in order for the house to win). Thus, the rule that the house wins copies theoretically contributes up to 1.25% to the house edge.

In regard to the standard house commission of 5% on player winnings, only player wins are commissionable. Players win with a frequency of about 32%, once tied hands and losing hands are factored out. This makes the actual yield of the commission only about 1.6% on overall play.

Combining the house edge on copies with the house edge on commissions, they add up to about 2.85%. Though apparently deemed adequate by the industry, the house edge is actually smaller than would be suggested by the 2.85% figure. It may be shown that using current house ways, dealers misplay about one hand per every 70 to 125 hands of a pai gow poker game. Using an average figure of one hand per every 80 hands misplayed, then when facing competent players who do not make playing errors, the cost to the house edge may be as much as about 1.25%, resulting in an overall house edge of only 1.6% (2.85% minus 1.25%). Since players also perform at varying playing strength levels, it may be fair to say that the typical house edge lies within a range of 1.8% to 2.5%, probably about 2.2%.

Accordingly, to be effective, the invention disclosed herein must maintain a house edge of about 2.2% or better after elimination of the standard house commission on player winnings.

B. Fostering Copies to Provide Additional House Edge

The inventor has determined that specific short side copies occur more frequently than others in pai gow poker. These are the two-card sides of A-K, A-Q, A-J, K-Q, and K-J. This occurs because out of the seven cards dealt to each position, players tend to select out the best available two cards for the short side to maximize the possibility of winning that side. Since poker rules rank pairs higher than any combination of two singletons, existing house ways do not account for the strength of high singletons on the short side. For example, they encourage excessive splitting of 2-pair hands in order to place a pair on the short side. This practice weakens the long side and may prevent winning the hand overall. Significantly, this flawed strategy reduces the chance of a copy on the short side, because the players, for their part, tend to arrange high singletons on the short side, as noted above. While a pair on the short side might have outranked these high singletons, since removal of the pair weakens the long side down to a one-pair side, the house would have been better off (and is better off on average) fostering a copy on the short side while holding a stronger long side.

The inventor arrived at this conclusion by observing the frequency at which high singletons copy on the short side. Table 1 below sets forth these frequency values:

TABLE 1

| Short side | Copy frequency |
|---|---|
| (A, K) | 7.2% |
| (A, Q) | 5.3% |
| (A, J) | 3.7% |
| (K, Q) | 6.3% |
| (K, J) | 3.9% |

Rather than take into account the standard winning rate of high singleton cards, the inventor added a strength factor based on how frequently these high singletons copy. For example, using information in the public domain, it may be observed that the A-K combination has a winning rate on the short side of 64.6%. Rather than derive a house way based on just this winning rate, as current house ways do, the inventor astutely took into account the 7.2% rate at which the combination copies on the short side as provided in Table 1 above (64.6%×1.072) to arrive at a truer assessment of winning rate for the A-K combination of 69.3% on the short side. Such truer assessments were used by the inventor to create new types of house ways superior to standard house ways. To illustrate the great benefit this novel disclosure provides, it may be observed that the combinations of high singletons set forth in Table 1 above occur 26.4% of the time in pai gow poker play, making this advantage very significant.

Table 2 sets forth these truer strength assessments comprising the winning rates of the following combinations of high singleton cards on the short side:

TABLE 2

| Cutoff points to keep two pair combinations, using copy factors to provide a dealer/banker advantage | | | | | | | |
|---|---|---|---|---|---|---|---|
| Short side Values | A-K | A-Q | A-J | A-x | K-Q | K-J | K-x |
| As Dealer | 69.3% | 62.4% | 57.7% | 50.1% | 47.0% | 39.8% | 35.1% |
| As Player | 64.6% | 59.3% | 55.6% | 49.7% | 44.2% | 38.3% | 35.0% |

Dealer value is calculated as player value times copying frequency, e.g., the dealers' A-K = 64.6 x 1.072 or 69.3%, as A-K copies 7.2% of the time.
For A-Q: copy factor is 5.3%; for A-J it is 3.7%; for K-Q it is 6.3%; for K-J it is 3.9%; for K-low it is 0.2%.

The fruit of the inventor's conception, research and development is the creation of new types of house ways defined by these qualities:

A. Two-pair handling—Whenever the dealer is dealt a hand containing two pairs, he categorizes the three singleton cards of the hand into one of the four possible categories:

1. Ace-face (i.e., A-K, A-Q, A-J)
2. Ace-low (i.e., Ace-10 or less)
3. King-face (i.e., K-Q or K-J)
4. King-low and lower (i.e., K-x and lower)

In a subsequent step, the dealer proceeds as follows for each of the above categories:

1. Ace-face—Dealer favors keeping together in the long side all two pairs where one of the pairs is a king pair and the other pair is a pair of 6's or lower, or any two-pair combination having a poker ranking lower than this two-pair combination.
2. Ace-low—Dealer favors keeping together in the long side all two pairs where one of the pairs is a king pair and the other pair is a pair of 5's or lower, or a queen pair and the other pair is a pair of 7's or lower, or any two-pair combination having a poker ranking lower than the second of these two-pair combinations.
3. King-face—Dealer favors keeping together in the long side all two pairs where the pairs are:
   - i) 10's and 3's or lower;
   - ii) 9's and 4's or lower;
   - iii) 8's and 5's or lower; or
   - iv) 7's and 6's or lower.
4. King-low and lower—Dealer favors keeping together in the long side all two pairs where the pairs are 6's and 5's or lower.

B. Straight or flush handling—Whenever the dealer is dealt a hand containing a straight or a flush together with two pairs, and there is a combination of A-J or stronger for the short side after accounting for the straight or flush, the dealer does not play the hand as a two-pair hand. Whenever the dealer is dealt a hand containing a straight or a flush together with two pairs, and the two pairs are 7's or lower, then the dealer does not play the hand as a two-pair hand.

The superiority of house ways fostering copies as per the current disclosure is shown in a comparison of the treatment of an illustrative 7-card hand under existing house ways versus the new types of house way of the current disclosure:

TABLE 3

| Illustration Hand: (Q, Q, 7, 7, A, K, 3) played as per existing house ways: | | | | | |
|---|---|---|---|---|---|
| Hand | Played as | Win | Push | Loss | Wins |
| Long side | Q, Q, A, K, 3 | 0.56 | — | 0.44 | |
| Short side | 7, 7 | 0.83 | — | 0.17 | |
| Combined hand | Q, Q, A, K, 3/7, 7 | 0.46 | (0.47) | 0.07 | 39 |

Summary:

(a) Wins per hundred hands = 39
(b) Win/loss transactions per hundred hands = 53
(c) Wasted transactions = 14

| Played as per the current disclosure: | | | | | |
|---|---|---|---|---|---|
| Hand | Played as | Win | Push | Loss | Wins |
| Long side | Q, Q, 7, 7, 3 | 0.83 | — | 0.17 | |
| Short side | A, K | 0.69 | — | 0.31 | |
| Combined hand | Q, Q, 7, 7, 3/A, K | 0.57 | (0.38) | 0.052 | 52 |

Summary:

(a) Wins per hundred hands = 52
(b) Win/loss transactions per hundred hands = 62 (100 hands minus 38 pushed hands)
(c) Wasted transactions = 10

| Comparison for (Q, Q, 7, 7, A, K, 3): | | | |
|---|---|---|---|
| Type | Prior Art | Invention | Improvement |
| Wins | 39 | 52 | 13 |
| Wasted | 14 | 10 | −4 |

The foregoing table makes clear that net wins are increased using the house ways of the current disclosure, and such is mathematically provable. Moreover, the table makes clear that using existing house ways, there is a greater number of win/loss transactions that simply cancel each other out and are, in effect, wasted time in return for some commissionable wins. On balance, however, the marginal benefit of some commissionable wins is offset by the increased number of net wins under the current disclosure together with the improvement to speed of play, which contribute to casino revenues overall and player satisfaction.

C. Pai Gow Push Mechanism

To compensate for elimination of a standard house commission on player winnings, the inventor altered the rules of pai gow poker to provide for a mechanism whereby the house obtains an edge by declaring a tie ("push") on specified hands that it would have otherwise lost. The inventor calls this the pai gow push mechanism ("push mechanism"). The push mechanism works as follows.

The push mechanism looks only to the dealer's hand to determine whether the main bets will push under the mechanism. If the dealer is dealt a pai gow hand of a specific level (e.g., queen-high, jack-high, etc. depending upon the version of the Game being played), all main bets push. Though the push mechanism causes players to tie main bets they might have otherwise won, player dissatisfaction is minimized by the statistical rarity of the pai gow hand levels recommended in the instant disclosure.

Pai gow high card hands exist in only six levels. These levels are 9-high pai gow up to ace-high pai gow. The ranges for these pai gow hands are set forth in Table 4 below (table values are applicable only if there is no straight or flush within the 7-card hand):

TABLE 4

| | |
|---|---|
| 1. | Ace high: (A, K, Q, J, 9, 8, 7) down to (A, 8, 7, 6, 4, 3, 2), with it being appreciated that (A, 8, 7, 5, 4, 3, 2) would be the straight: (A, 2, 3, 4, 5/7, 8) just as it is in a regular poker hand |
| 2. | King high: (K, Q, J, 10, 8, 7, 6) down to (K, 8, 7, 5, 4, 3, 2) |
| 3. | Queen high: (Q, J, 10, 9, 7, 6, 5) down to (Q, 8, 7, 5, 4, 3, 2) |
| 4. | Jack high: (J, 10, 9, 8, 6, 5, 4) down to (J, 8, 7, 5, 4, 3, 2) |
| 5. | Ten high: (10, 9, 8, 7, 5, 4, 3) down to (10, 8, 7, 5, 4, 3, 2) |
| 6. | Nine high: (9, 8, 7, 5, 4, 3, 2) and (9, 8, 7, 6, 4, 3, 2) |

Different levels of push mechanisms, e.g., ace-high, king-high, etc., provide different levels of house edge, as may be shown mathematically. Ace-high pai gow hands, including all lower pai gow hands, occur 16.1% of the time with a percentage of dealer losing hands of about 75% and a resulting house edge of about 12% using a bug joker. With a wild joker, and where no joker-based pai gow hands can occur, the ace-high frequency drops to 15.1%, with a resulting house edge of about 11.3%.

King-high pai gow hands, including all lower pai gow hands, occur 6.7% of the time, with a percentage of dealer losing hands of about 87% and a resulting house edge of about 5.8% regardless whether a bug joker or wild joker is used.

Queen-high pai gow hands, including all lower pai gow hands, occur 2.6% of the time, with a percentage of dealer losing hands of about 93% and a resulting house edge of about 2.4% regardless whether a bug joker or wild joker is used.

Jack-high pai gow hands, including all lower pai gow hands, occur 0.8% of the time, with a percentage of dealer losing hands of about 97% and a resulting house edge of about 0.8% regardless whether a bug joker or wild joker is used.

Ten-high pai gow hands, including all lower pai gow hands, occur 0.2% of the time, with a percentage of dealer losing hands of about 98% and a resulting house edge of about 0.2% regardless whether a bug joker or wild joker is used.

Nine-high pai gow hands occur 0.02% of the time with a percentage of dealer losing hands of about 99% and a resulting house edge of about 0.02%, regardless whether a bug joker or wild joker is used.

Preferred embodiments of the Game as it incorporates the push mechanism are presented by way of example in the samples of derived house rule sets in Section E below. It may be readily appreciated that the push mechanism of the instant disclosure may be used to similar advantage in connection with other versions of card-based pai gow poker where the number of cards dealt to each position varies from five cards to eight cards (in contrast to the 7-card version described up to this point). For example, in an 8-card version, the dealer pushes when dealt 8-card pai gow hands of a desired level such as king-high or queen-high, as described above. Similarly, in a 5-card version, the dealer pushes when dealt 5-card pai gow hands of a desired level such as queen-high, as described above.

D. Player Banking Alternative

In cases where a player might wish to bank a deal, as may be offered in some gaming establishments, a 5% commission would still be charged by the gaming establishment against all player wins according to this disclosed version of the Game. Thus, if player banking is permitted by the gaming establishment, the player banker could play head-on against fellow table players, and thus cover their main bet wagers as the player banker, instead of the gaming establishment's covering the main bet wagers. This situation arises because the gaming establishment is not banking (or covering) the players' bets when the players play against each other, yet it still has to maintain a house edge mechanism under player-banking conditions in order to cover the gaming establishment's overhead costs. It should further be noted that, as a standard convention, if proposition bets are offered and are played by the players, the gaming establishment would cover (take or pay out) these bets in all cases in this version of the Game. Thus, as described, the banking player would only cover (or pay off wagers acting as the bank) the action (wager settlements) on the main bets against fellow players of the Game.

E. Derived House Rule Sets

Without limiting the disclosure and merely for illustrative purposes, the inventor shows four exemplary house ways (house rule sets) of the Game below. These house rule sets have been derived from the method of the instant disclosure to foster copies and utilize a push mechanism to improve the house edge in lieu of commission. It may be readily appreciated that these house rule sets are not the only possible house rule sets embodying the method of the instant disclosure, which is more broadly defined in Sections B and C above.

These house rule sets may be used: to set hands for table play of the Game; in software for the configuration of wagering and non-wagering devices, personal mobile telephones, computers and gaming boxes as are known in the art; in media suitable for transferring software incorporating the Game as is understood in the art; in internet or intranet service for gaming or non-gaming purposes; and in public media, such as (but not limited to) television broadcasts. The house rule sets disclosed herein, and others contemplated by this disclosure, may be printed on instruction cards for use as reference by a gaming establishment's dealer in connection with the table game version of the Game, or otherwise displayed to assist dealers in other media, for example, on an LCD-type screen. Such house rule sets may also be shared by a gaming establishment with players, whether or not in connection with them acting as bankers, as desired.

Table 5 below illustrates an exemplary instruction sheet for the Game where the joker is used as a bug card:

TABLE 5

1. Pai gow: Highest card on long side, 2nd and 3rd strongest on short side - All hands push on dealer's jack-high pai gow or less (except bonus bets)
2. One pair: Always play pair on long side, with next two strongest cards up (short side)
3. Two-pairs: When the two-pair hand has a two-card top (short side) that is listed in the left column, perform the split or keep action to its right:

| Top: | Two-pair split action to take |
|---|---|
| AK: | split no two pairs with AK for the top, (not even Q's with J's) |
| AQ: | split kings with 7's or better only |
| AJ: | split K's with 5's or better, and Q's with 7's or better |
| A-low: | split K's w/3's+, Q's w/5's+, J's w/8's+, 10's or 9's w/8's+, keep lower |
| KQ: | split all two-pair jacks and better, 10's w/4's+, 9's w/5's+, keep all lower |
| KJ: | split all two-pair jacks and better, split 10 w/3's+, 9's w/4's+, 8's w/5's+ |
| K-low: | split all two-pair 9's and better, 8's w/3's+, 7's w/5's+, keep all lower |
| QJ: | split 7's and better, and 6's w/4's or 5's, keep all lower two pairs |

4. Three pairs: Always play the highest pair on short side
5. Three-of-a-kind, simple (no flush or straight with it):
   a. Three aces always split 2-and-1, with a pair of aces for the long side
   b. Three kings always split 2-and-1 with a 10 or lower top; else keep together with any ace or face card (ace, queen or jack short side)
   c. All other three-of-a-kinds (queens and less) never break up TABLE 5-continued 6. Two three-of-a-kinds: split off a pair from the higher group for the top
7. Straights and/or flushes:
   a. Straight or Flush with two pairs: when the straight or flush has a two-card top that is listed in the left column, perform the action to its right:
      - Pair: Always play the straight or the flush if a pair can be played on top
      - AK: Keep all straights and flushes with AK top, ignore all two pairs
      - AQ: Keep all straights and flushes with AQ top, ignore all two pairs
      - AJ: If straight only, split two pairs K's with 8's+ or Aces with 6's+
      - A-x: Split all two pairs king- or ace-high, else play the straight or flush
      - KQ: Split all two pairs queen-high+, else play straight or flush w/KQ
      - KJ: Split all two pairs jack-high+, and play any two pairs with ace top
      - K-x: Split eight-high two pairs or play two pairs with ace up
      - Q-x-: Split eight-high two pairs or play two pairs with king or ace up (e.g.: Kd-9d-8d-5d-5c-4h-4d play as 5's and 4's with K-9 up, ignore flush)
   b. Straight or flush with one pair: If straight or flush has a short side of:
      - K-low: always play as straight or flush
      - QJ: play face card pair with ace-face up, else play straight/flush
      - Q-x: play face card pair with ace-face up or hand AAxxx/KQ up
   c. Straight with flush: if you cannot produce a good hand with a) or b) above with either the straight or the flush, then play the one with the higher top. Except: if the tops are adjacent or essentially the same with both the straight and flush, then always play the stronger flush with essentially the same top ("Same tops" are A-9 vs. A-6 [both ace-low], K-Q vs. K-J [both king-face], K-10 vs. K-5 [both king-low], adjacent ace-face [AQ vs. AJ, but not AK vs. AJ], or both tops are Q-10 or lower)
   d. Straight or flush with three pairs: Automatic: Always play as a three pair
   e. Straight or flush with three-of-a-kind: Automatic: always play as straight or flush with pair or ace up (e.g., Play 9888765 as 98765/88, and play AA*2459 as A2*45/A9)
   f. Straight or flush with full house:
      i. Play as flush or straight if a pair 9's/better can be put on top, else:
      ii. Play split-up full house if split full house has jacks+ for top
      iii. Play as straight/flush if ace-king or pair can be played on top
      iv. Else treat as full house, as listed below in #9
   g. 6- or 7-card long straight or flush: play the straight/flush which gives the best short side, unless straight and flush with Q- top, then play flush
8. Straight flush or royal flush: Always (just) handle as straight or flush, above
9. Full house:
   a. If your full house's pair is 6's or less, and your hand has an AK (AQ with 5's or less, AJ with 2's), then keep the full house together, else split
   b. If you have a full house with an extra pair, then play the higher pair up
   c. Full house with straight or flush: Play as flush or straight with pair 9's or better top; else play split-up full house if it has jacks+ on top; else play as straight or flush if it has AK+ top; else treat as full house as per "a" above
   d. If your full house consists of two three-of-a-kinds or a four-of-a-kind with a three-of-a-kind, then split off a pair from the higher group, unless they are adjacent, then split up the lower group for a pair for the top
10. Four-of-a-kind, with no pair or three-of-a-kind with it:
    Four aces: Always split into two pairs of aces
    Four kings: Split into two pairs only without an ace - else play as four-of-a-kind kings with AQ/AJ up; with ace-low (A-10 or less) play as a 3/1 split, as KKKxx/AK
    Four queens: Keep together with ace-jack or ace-king top, but with ace-low (A-10 or less) split 3/1 as 3 Q's and A-Q, else split into two pairs of queens without an ace
    Jacks or 10's: Keep together with any ace, else split into two pairs of jacks/10's
    9's and 8's: Keep together with any king-face or better top, else split
    7's: Keep together with a king or better top, else split
    6's: Keep together with a queen or better top, else split
    5's or less: Always keep together
11. Four-of-a-kind - with a pair: Always play a four-of-a-kind with a pair as an unsplit four-of-a-kind down with the pair up on the short side, Except: Four aces or kings with a pair of 3's or 2's, then split off a high pair from the four-of-a-kind, to play two very strong pairs down with a top pair up
12. For four-of-a-kind with a three-of-a-kind: Split off pair from the higher group for the top, unless the groups are adjacent, then keep the four-of-a-kind together
13. Five aces: Play a pair of aces in the two-card side in ALL cases Table 6 below illustrates an exemplary instruction sheet for the Game where the joker is used as a bug card:

TABLE 6

1. Pai gow: Highest card on long side, 2nd and 3rd strongest on short side
   Hands may push on dealer's low pai gow or less (selected Q or J by house)
2. One pair: Always play pair on long side, with next two strongest cards up
3. Two pairs:
   a. Ace-high two pairs always split
   b. With ace-face top, do not split pairs except K w/5+ and Q w/7+
   c. With A-low, split all K's, Q-5+, J-7+, and 10's w/8-9's, keep other pairs
   d. With K-face top split 10's with 4's+, 9's w/ 5's+, 8's w/6's+, keep 7's
   e. Keep all low pairs of 6's or less, except split 6's w/5's, 4's with Q or less
   f. Split all other two pairs without an ace, but keep together with an ace
4. Three pairs: always play the highest pair on short side
5. Three-of-a-kind, simple (no flush or straight with it):
   a. Three aces always split 2-and-1, as a pair of aces for the five-card side
   b. Split three kings 2-and-1 with a J high top or less
   c. All other three-of-a-kinds (queens and less) never break up
6. Two three-of-a-kinds: split off a pair from the higher group for the top
7. Straights and/or flushes:
   a. Straight or flush with ace-face or pair for the top: Always play as straight or flush with ace-face or pair top, and ignore all two pairs present
   b. Straight or flush with two pairs with low top:
      Play as straight/flush except:
      Face-high two pair with 6's or better can be split, OR:
      The straight or flush has a K-low or worse top, AND:
      i. Eight-high two pairs can be split, OR
      ii. Two pairs with any ace top can be played
   c. Straight with flush: If you cannot produce a good hand with a), b) or c), then play the better top, except play the flush when tops are adjacent or both Q or less
   d. Straight or flush with three pairs: Always play as a three-pair hand
   e. Straight or flush with three of a kind: always play as straight or flush with pair or ace up (Play 9888765 as 98765/88, and AA*2459 = A2*45/A9)
   f. Straight or flush with full house: Play as flush or straight if it has any pair for the top, unless split full house has jacks or better pair; else treat as full house below
   g. 6- or 7-card long straight or flush: play the straight or flush best top TABLE 6-continued

| |
|---|
| 8. Straight flush or royal flush: Always handle as straight and/or flush, above |
| 9. Full house: |
| a. If you have a full house with an extra pair, then play the higher pair up |
| b. If your full house's pair is 5's or less, keep with AK or AQ, else split |
| 10. Four-of-a-kind, with no pair or three-of-a-kind with it: |
| Four aces: always split into two pairs of aces |
| Four kings: split into two pairs without an ace-face, but play as 4 K's with AQ/AJ |
| Four queens: keep together with an ace-10 or better top, else split into two pairs |
| Jacks or 10's: keep together with any ace top, else split as two pairs of jacks/10s |
| 9's and 8's: keep together with any king-jack or better top, else split |
| 7's or 6's: keep together with any king or better top, else split |
| 5's or less: always keep together |
| 11. Four-of-a-kind - with a pair: Play pair on top unless four aces or kings with 3's/2's |
| 12. For four-of-a-kind with a three-of-a-kind, split a pair from the higher group for top |
| 13. Five aces: Always play a pair of aces up |

Table 7 below illustrates an exemplary instruction sheet for the Game where the joker is used as a bug card:

TABLE 7

| |
|---|
| 1. Pai gow: Highest card in five card hand, $2^{nd}$ and $3^{rd}$ strongest on two card side |
| All hands push on dealer's queen-only pai gow, except bonus bets |
| 2. One pair: Always play pair in five card side, with next two strongest cards up |
| 3. Two pairs: |
| a. Always split ace-high two pairs |
| b. Always split faces and 7's or better, except when having an AK for the top |
| c. Always keep all two-pairs 6's and less |
| d. Split all other two pairs without an ace, but keep together with an ace |
| 4. Three pairs: always play the highest pair in the two-card side |
| 5. Three-of-a-kind, simple (no flush or straight with it): |
| a. Three aces always split 2-and-1, as a pair of aces for the five-card side |
| b. All other three-of-a-kinds (kings and less) never break up |
| 6. Two three-of-a-kinds: split off a pair from the higher group for the top |
| 7. Straights and/or flushes: |
| a. Straight or flush with ace-face or pair for the top and two pairs: Play as straight/flush with ace-face or pair top; ignore all two pairs present |
| b. Straight or flush with KJ to A-x top and two pairs: Play as straight/flush, except if aces or faces with 6's or better two pairs can be split |
| c. Straight or flush K-low or lower top and two pairs: Play as two pairs if: |
| i. Eight-high two pairs can be split, OR |
| ii. Two pairs with any ace top can be played |
| d. Straight with flush: If you cannot produce a good hand with a), b) or c), then play the straight or flush with the higher top |
| e. Straight or flush with three pairs: Always play as a three pair hand |
| f. Straight or flush with three-of-a-kind: always play as straight or flush with pair or ace up (Play 9888765 as 98765/88, and AA*2459 = A2*45/A9) |
| g. Straight or flush with full house: Play as flush or straight if it has any pair for the top, else treat as full house, below |
| 8. Straight flush or Royal Flush: Always handle as straight and/or flush, above |
| 9. Full house: |
| a. If you have a full house with an extra pair, then play the higher pair up |
| b. If your full house's pair is 5's or less, keep with AK or AQ, else split |

TABLE 7-continued

| |
|---|
| 10. Four-of-a-kind: |
| a. Always split four aces 2 & 2, unless there is a pair of 4's or better for the top |
| b. Keep all other quads together with an ace-face or pair for the top |
| c. Split four kings or queens 2 & 2 with an ace-10 or less for the top |
| d. Keep 10's or jacks together with any ace or pair for the top, else split 2 & 2 |
| e. Keep 7's through 9's together with any king-face or better, else split 2 & 2 |
| f. Keep 6's and lower in all cases |
| 11. For four-of-a-kind with a three-of-a-kind, split a pair from the higher group for top |
| 12. Five aces: Always play a pair of aces up |

Table 8 below illustrates an exemplary instruction sheet for the Game where the joker is completely wild:

TABLE 8

| |
|---|
| 1. Pai gow: Highest card in five-card hand, 2nd and 3rd strongest on two-card side |
| All hands push on dealer's queen-only pai gow, except bonus bets |
| 2. Two pairs: |
| a. Always split ace-high two pairs |
| b. Always split faces and 7's or better, except when having an AK for the top |
| c. Always keep all two-pairs 6's and less |
| d. Split all other two pairs without an ace, but keep together with an ace |
| 4. Three pairs (without wild full house): play the highest pair in the two-card side |
| 5. Natural three-of-a-kind, simple (no flush, straight or pairs with it): |
| a. Three aces always split 2-and-1, as a pair of aces for the five-card side |
| b. All other three-of-a-kinds (kings and less) never break up |
| 6. Wild three-of-a-kind or two wild pairs: Play as three-of-a-kind with an AQ or better top, else play as best two pair hand (e.g., *AQ6642 = AQ/66642, *KQ6642 = 66/KKQ42) |
| 7. Two natural three-of-a-kinds: always split off a pair from the higher group for the top |
| 8. Straights and/or flushes: |
| Straight or flush with two pairs: |
| a. Play as a straight with AQ or better for the top, play flush with AJ or better top |
| b. Play as two pairs if eight-high two-pairs can be split, or if any two pairs can be played together with an ace for the top |
| c. Else play the straight or the flush |
| Straight with flush: Play the straight or flush with the better two-card side |
| Straight or flush with wild three pairs/full house: play the "best pair top" straight, flush or full house |
| Straight or flush with three-of-a-kind: always play as straight or flush with pair or ace top |
| 6- or 7-card long straight and/or flush: play the straight or flush best top |
| 9. Straight flush or royal flush: Always handle as straight and/or flush, above |
| 10. Full house - wild or natural: |
| a. If you have two full houses, then play the full house with the highest pair up |
| b. If your full house's pair is 5's or less, keep together with AK or AQ, else split |
| 11. Wild four-of-a-kind: Play as either full house or four-of-a-kind with best top pair |
| 12. Natural four-of-a-kind: |
| a. Always split four aces 2 & 2, unless there is a pair of 4's or better for the top |
| b. Keep all other quads together with an ace-face or pair for the top |
| c. Split four kings or queens 2 & 2 with an ace-10 or less for the top |
| d. Keep 10's or jacks together with any ace or pair for the top, else split 2 & 2 |

TABLE 8-continued

| |
|---|
| e. Keep 7's through 9's together with any king-face or better, else split 2 & 2 |
| f. Keep 6's and lower in all cases |
| 13. For four-of-a-kind with a three-of-a-kind: Split a pair from the higher group for top |
| 14. Five-of-a-kind: Always play extra pair up, and the natural four-of-a-kind down, unless four aces or kings with 3's or 2's, then put up a pair of aces or kings |
| When holding the wild card joker, and having a hand combination that is not addressed above: Play the hand that gives the strongest five-card "hand type" or category, if an AQ or better can be placed on the two-card side, else play the hand that gives the best two-card side |

FIGS. 1-8 are flow diagrams indicating steps in the method as embodied in the first of the exemplary house rule sets presented above. These flow diagrams are not intended to be limiting, but illustrate one embodiment of the Game as provided in this disclosure. As explained in paragraph 90 above, the result of this logic may be incorporated as software for wagering or non-wagering devices, etc. as would be understood in the art.

Figure 1B:
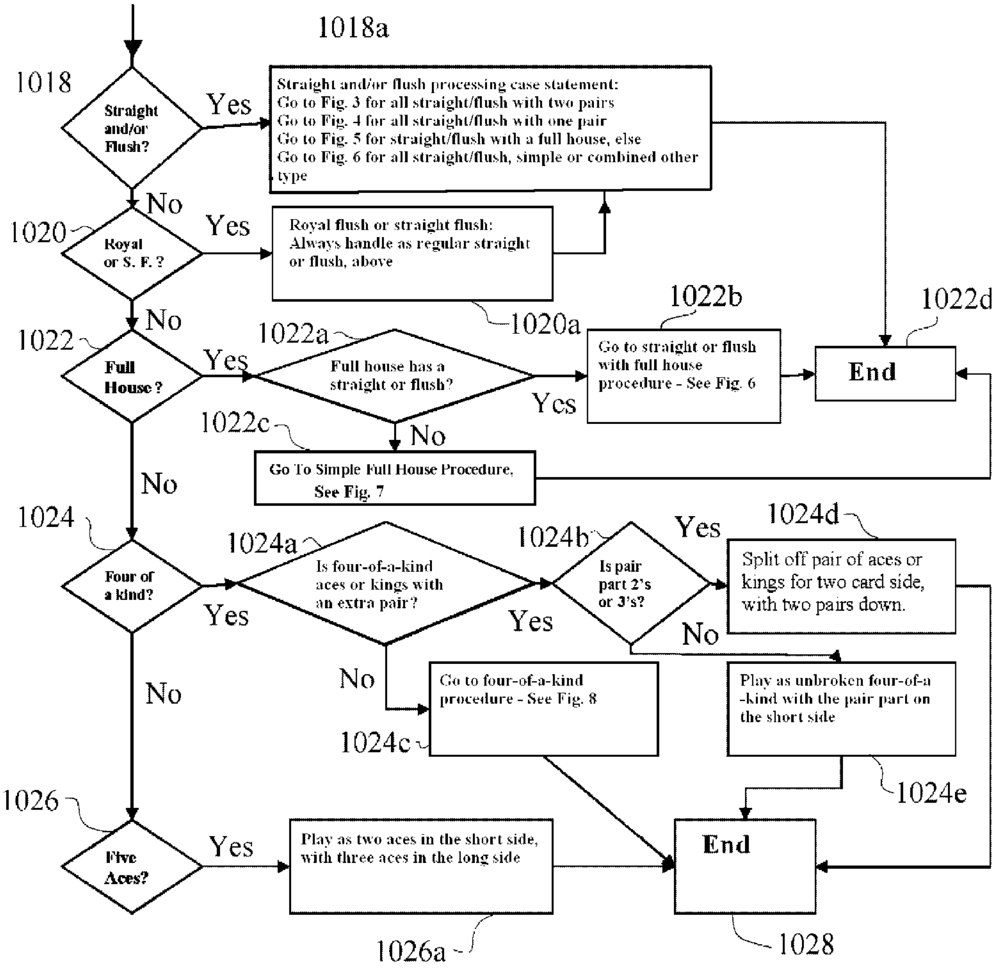
FIG. 1B depicts another portion of the flow diagram of FIG. 1A indicating steps in the method of the Game as embodied in an exemplary house rule set.

FIGS. 1A-1B indicate steps of the hand-setting process for dealers, after the players have been dealt and set their hands, in an embodiment of the Game. In a step 1000, the game begins. The hands are examined in step 1002. The dealer may now examine whether the hand is a pai gow hand in step 1004. In step 1004*a*, the second and third highest valued cards are placed into the dealer's short side. In step 1004*b*, one evaluation step would be to determine if the dealer's hand is a jack-high or lower pai gow. If the dealer's hand meets the criterion of step 1004*b*, then play proceeds to step 1004*d*, all main bets push, and play proceeds to step 1016.

Step 1006 poses the question: is the dealer's hand a one-pair hand? If so, the hand is arranged and the dealer's pair goes into the long side and the dealer's next two cards go into the short side as set forth in step 1006*a*, resulting in the dealer standing on this arrangement of cards (end 1016) to be compared against the other players' hand arrangements.

If the answer to the question of step 1006 is no, then step 1008 asks whether there are two pairs in the dealer's hand. If there are two pairs, the dealer is directed to step 1008*a*, which directs the dealer to FIG. 2 for instruction on how to set his two-pair hand. Step 1010 asks whether the dealer has a three-pair hand. If the dealer has a three-pair hand, he proceeds to step 1010*a*, which instructs to set the hand using the highest pair in the short side. If the answer to step 1010 is no, the dealer proceeds to step 1012, which asks whether the hand has a three-of-a-kind. If the answer is yes, the dealer proceeds to step 1012*a*. Step 1012*a* instructs the dealer to always split three aces with one ace going into the short side along with the next highest singleton. If the three-of-a-kind is three kings, and the next highest singleton is jack or less, then one king goes into the short side with the next highest singleton. If the three-of-a-kind is queens or lower, then the dealer is instructed to keep the three-of-a-kind together in the long side, with the two highest singletons going to the short side. If the answer to step 1012 is no, then the dealer proceeds to step 1014, which asks whether the hand has two three-of-a-kinds. If the answer is yes, the dealer is instructed to proceed to step 1014*a*. Step 1014*a* instructs the dealer to split off a pair from the higher three-of-a-kind to play on the short side. If the answer is no, the dealer is instructed to proceed to step 1018.

Step 1018 asks whether the dealer's hand has a straight and/or a flush. If the answer is yes, the dealer is instructed to proceed to step 1018*a*. If the flush and/or straight contain two pairs, then the dealer is instructed to go to FIG. 3 for processing a straight and/or flush with two pairs. If the straight and/or flush is combined with one pair, the dealer is instructed to go to FIG. 4 for processing the hand. If the straight and/or flush is combined with a full house, then the dealer is instructed to proceed to FIG. 5. For all other types of straights and/or flushes, the dealer is instructed to proceed to FIG. 6.

If the answer to step 1018 is no, then the dealer is instructed to proceed to step 1020, asking if the hand has a royal flush or straight flush. If the answer is yes, the dealer is instructed to proceed to step 1020*a*. Step 1020*a* instructs the dealer to simply treat the hand as a regular straight and/or flush, as in step 1018*a*. If the answer is no, the dealer is instructed to proceed to step 1022, asking whether the hand contains a full house. If the answer is yes, the dealer is instructed to proceed to step 1022*a*. Step 1022*a* asks if the full house also has a straight and/or a flush with it. If the answer is yes, the dealer is instructed to proceed to step 1022*b*. Step 1022*b* directs the dealer to handle the hand as a straight and/or flush with full house by proceeding to FIG. 6. If the answer is no, then the dealer is instructed to proceed to step 1022*c*. Step 1022*c* instructs the dealer to proceed to the simple full house procedure in FIG. 7.

If the answer to step 1022 is no, the dealer is instructed to proceed to step 1024, asking whether the hand is a four-of-a-kind. If the answer is yes, the dealer is instructed to proceed to step 1024*a*, asking whether the hand contains a four-of-a-kind aces or kings with an extra pair. If the answer is yes, the dealer is instructed to proceed to step 1024*b*, asking whether the pair is a pair of 2's or 3's.

If the answer is yes, the dealer is instructed to proceed to step 1024*d*. Step 1024*d* instructs the dealer to split off a pair of aces or kings for the short side, playing two pairs on the long side.

If the answer to step 1024*b* is no, the dealer is instructed to proceed to step 1024*e*. Step 1024*e* instructs the dealer to play the four-of-a-kind on the long side. If the answer to step 1024*a* is no, the dealer is instructed to proceed to step 1024*c* for the four-of-a-kind procedure of FIG. 12. If the answer to step 1024 is no, the dealer is instructed to proceed to step 1026. Step 1026 asks whether the hand contains five aces, to which the answer can only be yes at this point. The dealer is therefore instructed to proceed to step 1026*a*. Step 1026*a* instructs the dealer to play the hand as two aces in the short side, with three aces in the long side in all cases.

Figure 2:
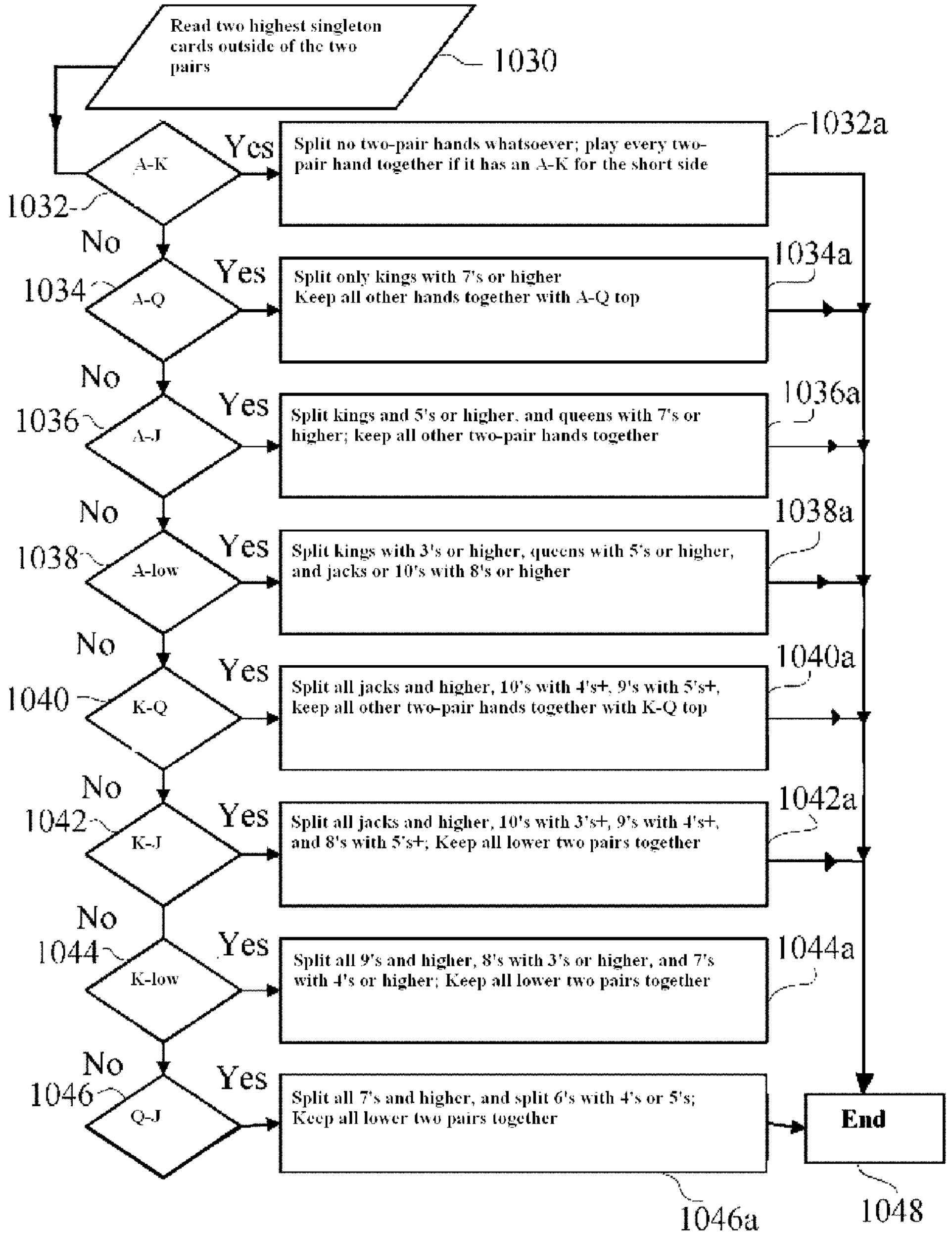
FIGS. 2-8 depict yet other portions of the flow diagrams indicating steps in the method of the Game as embodied in an exemplary house rule set.

If the dealer was directed to FIG. 2, he is processing simple, two-pair hands. The dealer begins at step 1030, where he reads the two highest singleton cards outside of the two pairs. Step 1031 asks whether the two highest singleton cards are ace and king. If the answer is yes, the dealer is instructed to proceed to step 1032*a*, where he is instructed to play the A-K on the short side, and to play the two pairs together on the long side. If the answer is no, the dealer is instructed to proceed to step 1034, asking whether the two singleton cards are A-Q. If the answer is yes, the dealer is instructed to proceed to step 1034*a*. Step 1034*a* instructs the dealer to split only kings with 7's or higher. If the answer is no, the dealer is instructed to proceed to step 1036, asking whether the two singletons are A-J. If the answer is yes, the dealer is instructed to proceed to step 1036*a*, which instructs him to split kings with 5's or higher, and queens with 7's or higher. If the answer is no, the dealer is instructed to proceed to step 1038, asking whether the two singleton cards are ace with a low card of 10 or less. If the answer is yes, the dealer is instructed to split kings with 3's or higher, queens with 5's or higher, and jacks or 10's with 8's or higher.

If the answer to step 1038 is no, the dealer is instructed to proceed to step 1040, asking whether the singletons are K-Q. If the answer is yes, the dealer proceeds to step 1040*a*. Step 1040*a* instructs the dealer to split all jacks and higher, 10's with 4's or higher, and 9's with 5's or higher. The dealer keeps all other two-pairs together on the long side and K-Q top on the short side. If the answer to step 1040 is no, the dealer is instructed to proceed to step 1042. Step 1042 asks whether the singletons are K-J. If the answer is yes, the dealer is instructed to proceed to step 1042*a*, where he will split all jacks and higher, 10's with 3's or better, 9's with 4's or better, and 8's with 5's or better. If the answer is no, the dealer is instructed to proceed to step 1044.

Step 1044 asks whether singletons are K-x. If the answer is yes, the dealer is instructed to split all 9's or higher, 8's with 3's or higher, and 7's with 4's or higher. If the answer to step 1044 is no, the dealer is instructed to proceed to step 1046, asking whether singletons are Q, J or less. If the answer is yes, and it can only be yes at this point, the dealer is instructed to split all 7's and higher, and splits 6's with 4's or 5's. The dealer keeps all lower two pairs together in the long side.

Figure 3:
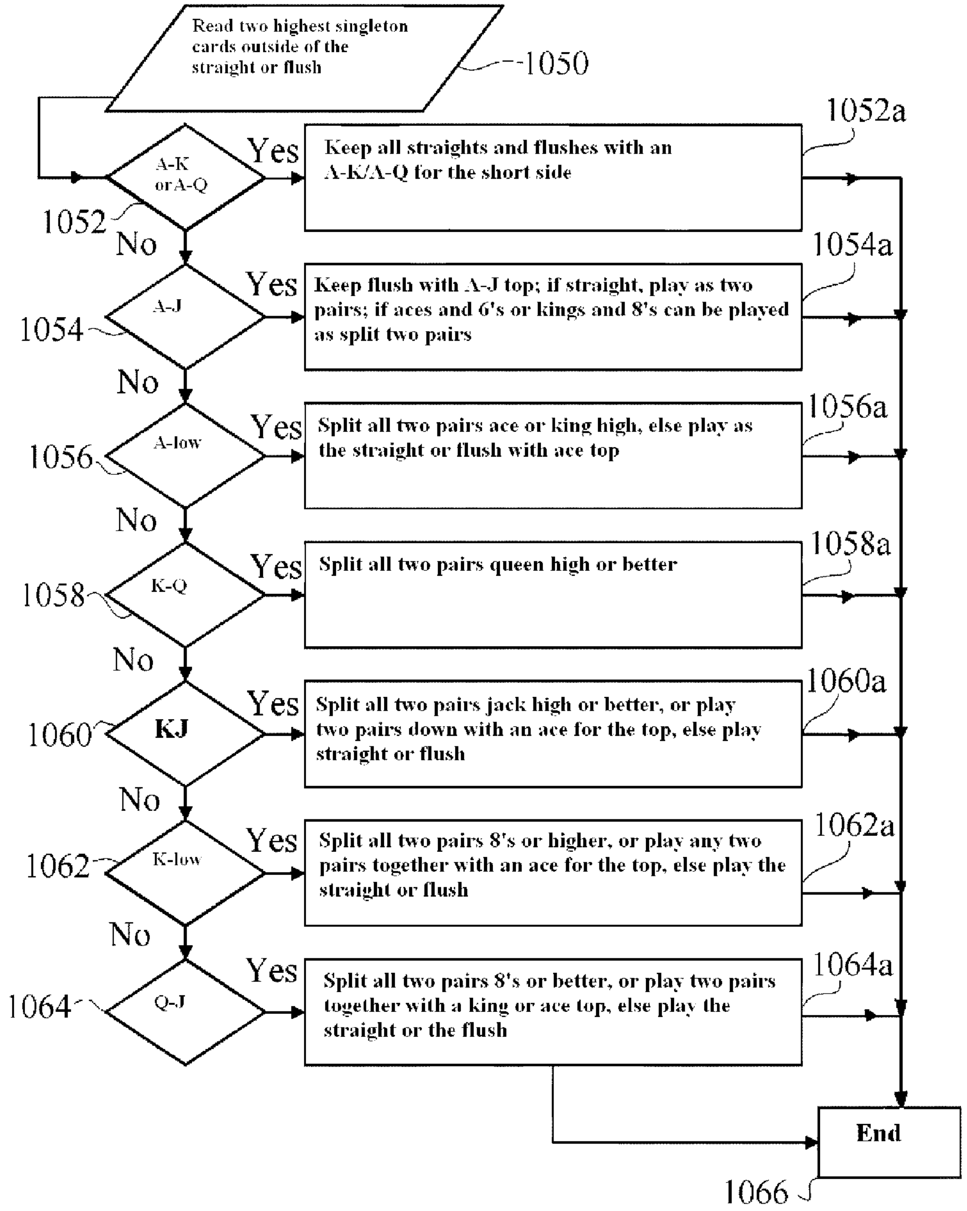

FIG. 3 sets forth the flow of instructions for the handling of straights and/or flushes that also contain two pairs. Step 1050 instructs the dealer to read the two highest singleton cards outside of the straight and/or flush. The dealer is instructed to proceed to step 1052, asking whether the singletons are A-K or A-Q. If the answer is yes, the dealer proceeds to step 1052*a*, which instructs the dealer to keep all straights and flushes with an A-K or A-Q for the short side. If the answer is no, then the dealer proceeds to step 1054, asking whether the singletons are A-J. If the answer is yes, the dealer keeps all flushes, and will keep all straights unless the two pairs are aces and 6's or better, or kings and 8's or better, in which case he plays the hand as two split pairs. If the answer is no, the dealer is instructed to proceed to step 1056, asking whether the singletons are ace with a low card (10 or less). If the answer is yes, the dealer is instructed to split all two pairs that are ace- or king-high, else he plays the straight or flush with the ace on the short side. If the answer is no, the dealer is instructed to proceed to step 1058, asking whether the singletons are K-Q. If the answer is yes, the dealer is instructed to split all two pairs that are queen-high or better, else to play the straight or flush. If the answer is no, the dealer is instructed to proceed to step 1060, asking whether the singletons are K-J. If the answer is yes, the dealer is instructed to split all two pairs that are jack-high or better, or play two pairs in the long side with an ace for the short side, else play the straight or flush. If the answer is no, the dealer is instructed to proceed to step 1062, asking whether the singletons are K-x. If the answer is yes, the dealer is instructed to proceed to step 1062*a*, where he splits all two pairs that are 8's or higher, or to play the two pairs together with an ace for the short side, else to play the straight or flush. If the answer is no, then the dealer must have singleton cards of Q-J or less, as asked in step 1064. Since the answer can only be yes, the dealer is instructed to split all two pairs that are 8's or better, or to play two pairs together with a king or ace top, else to play the straight or flush.

Figure 4:
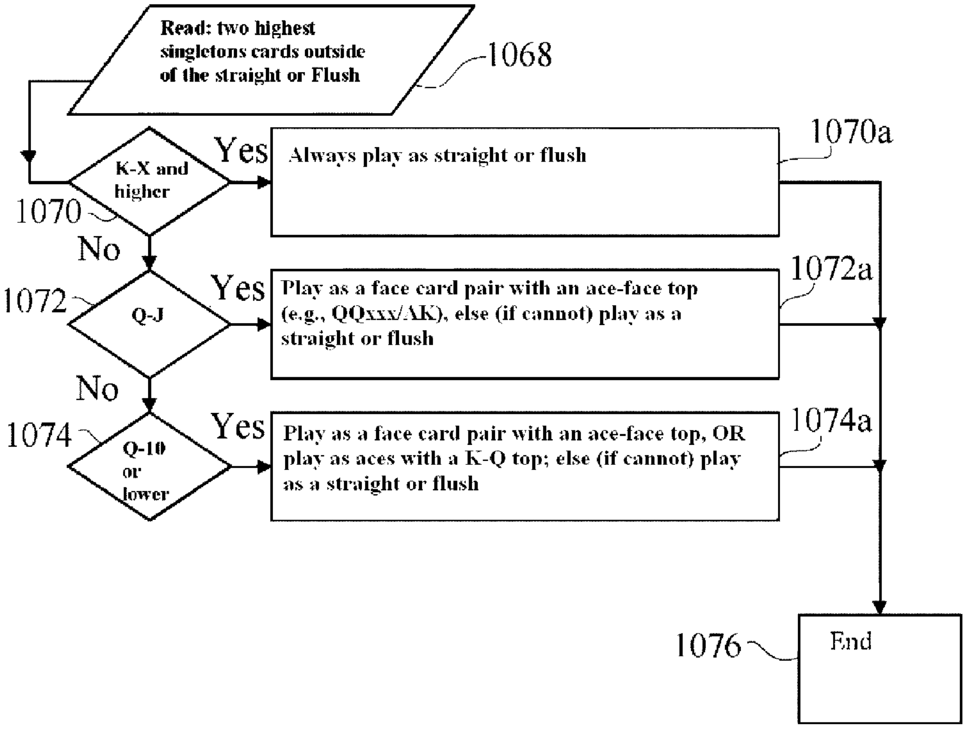

FIG. 4 concerns the handling of straights and/or flushes combined with one pair. Step 1068 instructs the dealer to read the two highest singleton cards outside of the straight or flush. Step 1070 asks whether the singleton cards are K-x or higher. If the answer is yes, the dealer is instructed to always play the straight or flush. If the answer is no, the dealer is instructed to proceed to step 1072, where the dealer is asked whether the two singleton cards are Q-J. If the answer is yes, the dealer is instructed to play a face card pair with an ace-face short side, else he must play the straight or flush. If the answer is no, then the dealer can only have singleton cards of Q-10 or lower. The dealer is then instructed to proceed to step 1074*a*, where he is instructed to play a face-card pair with an ace-face top, or to play a pair of aces in the long side with a K-Q short side, else he is instructed to play the straight or the flush.

Figure 5:
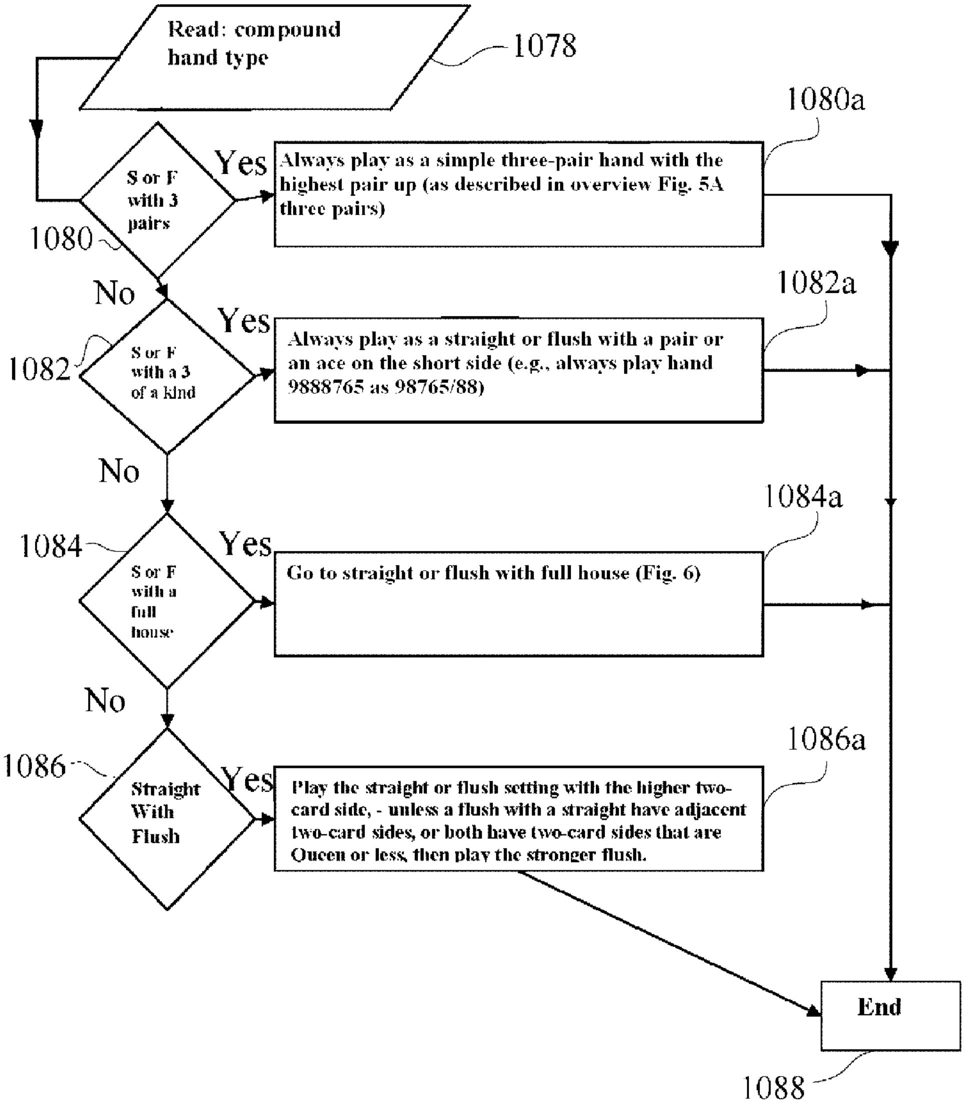

FIG. 5 concerns compound hand-types of straights or flushes with three pair, a three-of-a-kind, a full house, or just a straight with a flush. Step 1078 instructs the dealer to read the type of compound hand. The dealer is instructed to proceed to step 1080, asking whether the hand is a straight or flush with three pairs. If the answer is yes, the dealer is instructed to proceed to step 1080*a*, where he is instructed to always play it as a simple three-pair hand, with the highest pair on the short side. If the answer is no, the dealer is instructed to proceed to step 1082, asking whether the compound hand-type is a straight or a flush with a three-of-a-kind. If the answer is yes, the dealer is instructed to proceed to step 1082*a*, to always play as a straight or flush with a pair or an ace on the short side. If the answer is no, the dealer is asked whether the hand contains a full house. If the answer is yes, the dealer is instructed to proceed through step 1084*a*, to go to FIG. 6 (straight or flush with full house handling). If the answer is no, the dealer is instructed to proceed to step 1086, which can only be a straight combined with a flush. In this case, the dealer is instructed to proceed to step 1086*a*, where he is instructed to play the straight or the flush with the higher short side, unless the flush or the straight produce short sides that are adjacent (e.g., A-K versus A-Q, K-Q versus K-J, etc.). When both the straight and flush have adjacent short sides, the dealer is instructed to always play the stronger flush.

Figure 6:
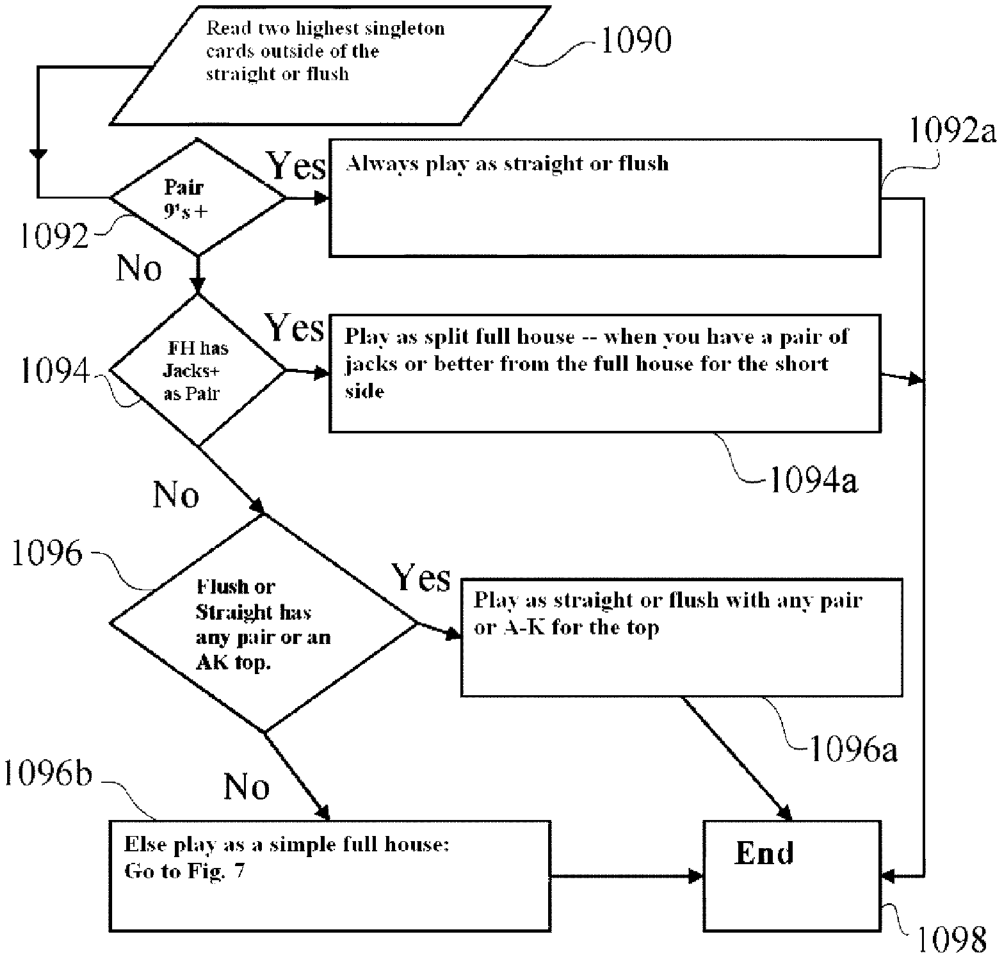

FIG. 6 concerns the handling of a straight and/or flush with a full house. Step 1090 instructs the dealer to read the two highest singleton cards outside of the straight or flush. Step 1092 asks whether the short side is a pair of 9's or higher. If the answer is yes, the dealer is instructed to proceed to step 1092*a*, where he is instructed to play the hand as a straight or a flush. If the answer is no, the dealer is instructed to proceed to step 1094, asking whether the pair contained within the full house is jacks or higher. If the answer is yes, the dealer is instructed to proceed to step 1094*a*, where he is instructed to play the hand as a split full house. If the answer is no, the dealer is instructed to proceed to step 1096, asking whether the flush or straight has an A-K or a pair for the short side. If the answer is yes, the dealer is instructed to proceed to step 1096*a*, where he is instructed to play the hand as a straight or flush with the A-K or pair short side. If the answer is no, the dealer is instructed to proceed to step 1096*b*, which instructs him to play the hand as a simple full house, as instructed in FIG. 7.

Figure 7:
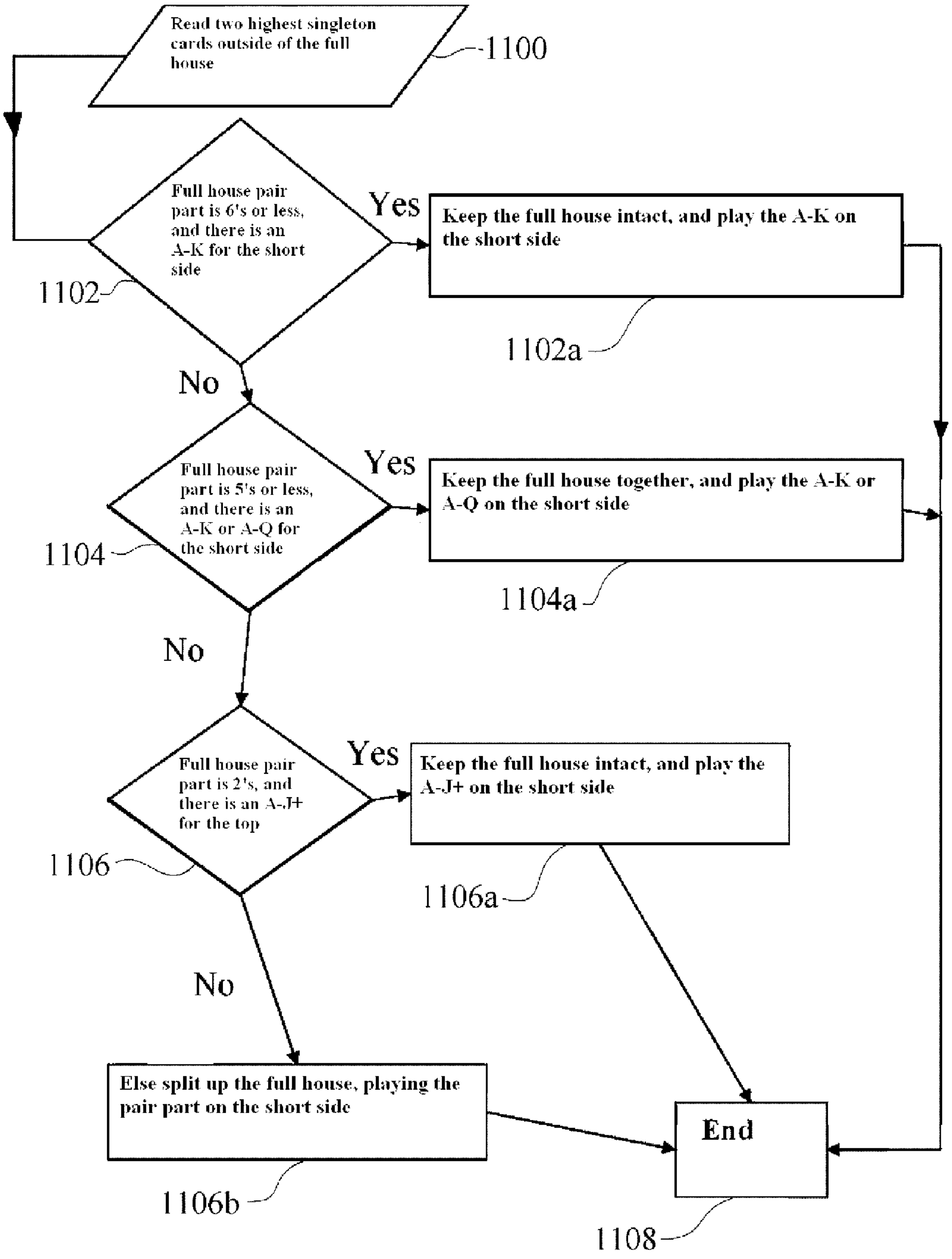

FIG. 7 concerns the handling of a simple full house-type hand. Step 1100 instructs the dealer to read the two singleton cards outside the full house. Step 1102 asks whether the pair contained within the full house is 6's or less, and the singleton cards are A-K. If the answer is yes, the dealer is instructed to proceed to step 1102*a*, where he is instructed to play the full house on the long side and the A-K on the short side. If the answer is no, the dealer is instructed to proceed to step 1104, asking whether the pair contained within the full house is 5's or less, and the singletons are A-K or A-Q. If the answer is yes, the dealer is instructed to proceed to step 1104*a*, where he is instructed to play the full house on the long side, and to play the A-K or A-Q on the short side. If the answer is no, the dealer is instructed to proceed to step 1106, asking whether the pair contained within the full house is 2's, and the singletons are A-J or stronger. If the answer is yes, the dealer is instructed to proceed to step 1106*a*, where he is instructed to keep the full house in the long side, and to play the A-J or higher singletons on the short side. If the answer is no, the dealer is instructed to proceed to step 1106*b*, instructing him to split up the full house, playing the pair from the full house on the short side.

Figure 8:
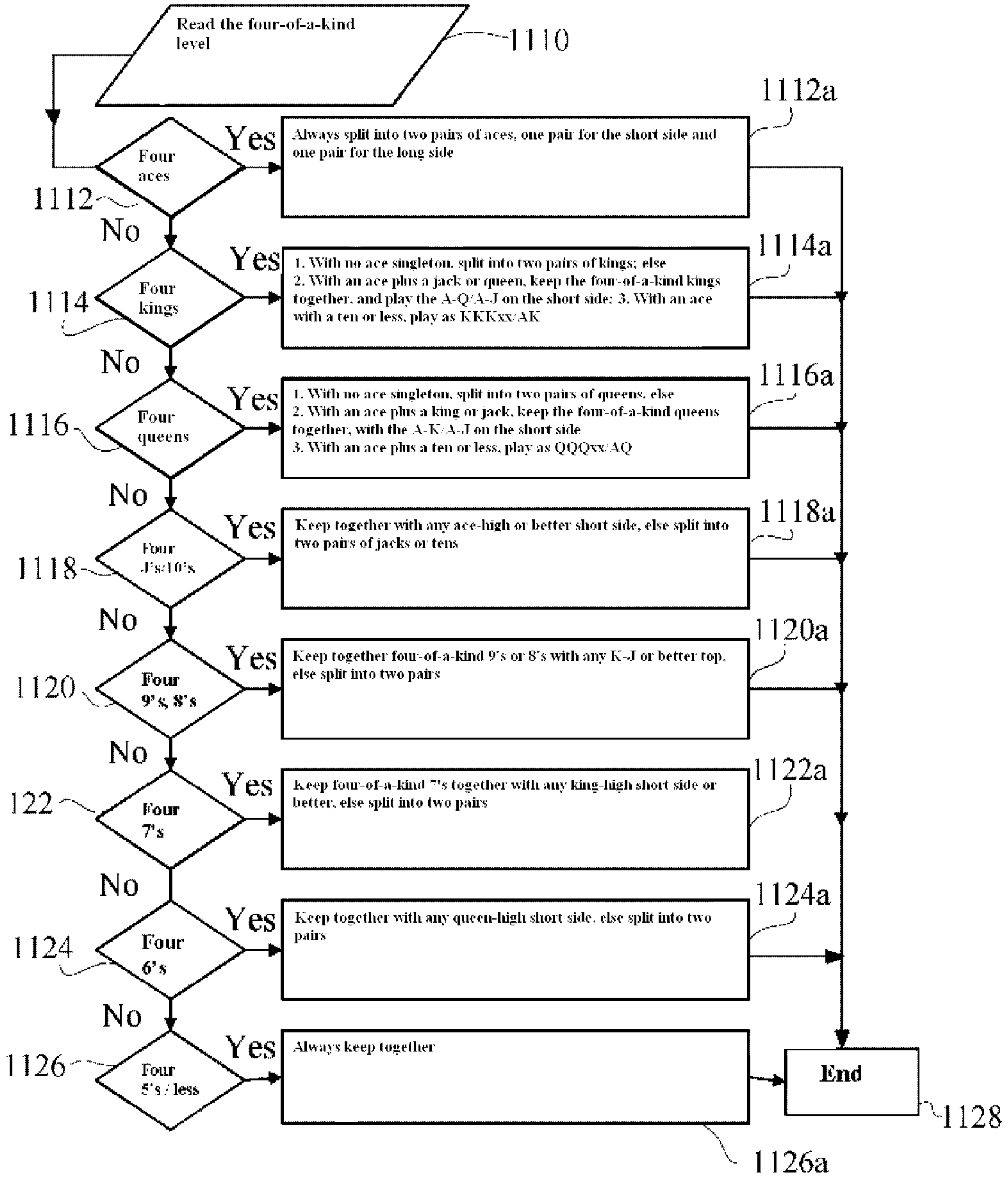

FIG. 8 concerns the handling of four-of-a-kind hands lacking an extra pair. In step 1110, the dealer reads the level of the four-of-a-kind and proceeds to step 1112, asking the dealer whether the four-of-a-kind is aces. If the answer is yes, the dealer is instructed to proceed to step 1112*a*, where he is instructed to always split four aces into two pairs of aces, one pair for the long side and one pair for the short side. If the answer is no, the dealer is instructed to proceed to step 1114, asking whether the four-of-a-kind is kings. If the answer is yes, the dealer is instructed to proceed to step 1114*a*, where he is instructed to do the following: (1) if there is no ace singleton present, the dealer splits four kings into two pairs of kings, one for each side; (2) if an ace plus a jack or queen are present, the dealer keeps the four-of-a-kind kings together, and plays the A-Q or A-J on the short side; (3) if an ace and a 10 or less are present, the dealer plays three kings on the long side and an A-K on the short side. If the answer is no, the dealer is instructed to proceed to step 1116, asking whether the four-of-a-kind is queens. If the answer is yes, the dealer is instructed to proceed to step 1116*a*, where he is instructed to do the following: (1) if no ace singleton is present, the dealer splits his four queens into two pairs of queens, one for each side; (2) if an ace plus a king or a jack are present, the dealer keeps the four-of-a-kind queens together on the long side, with the A-K or A-J as the short side; (3) if an ace or a 10 or less are present, the dealer plays three queens on the long side, with an A-Q as the short side. If the answer is no, the dealer is instructed to proceed to step 1118, asking whether the four-of-a-kind are jacks or 10's. If the answer is yes, the dealer keeps the four-of-a-kind together with any ace-high or better short side, else he splits it into two pairs of jacks or 10's, one pair for each side. If the answer is no, the dealer is instructed to proceed to step 1120, asking whether the four-of-a-kind is 9's or 8's. If the answer is yes, the dealer keeps the four-of-a-kind together with any K-J or better short side, else he splits the four-of-a-kind into two pairs, one for each side. If the answer is no, the dealer is instructed to proceed to step 1122, asking whether the four-of-a-kind is 7's. If the answer is yes, the dealer keeps the four-of-a-kind together with any king-high or better short side, else he splits the four-of-a-kind 7's into two pairs, one for each side. If the answer is no, the dealer is instructed to proceed to step 1124, asking whether the four-of-a-kind is 6's. If the answer is yes, he keeps the four-of-a-kind 6's together with any queen-high or better short side, else he splits it into two pairs of 6's, one for each side. If the answer is no, the dealer is instructed to proceed to step 1126, asking whether the dealer has four 5's or lower, to which the answer must be yes. The dealer is then instructed to proceed to step 1126*a*, where he is instructed to keep the four-of-a-kind together, with the next highest two singletons placed on the short side.

F. Novel Proposition Bets i. Dynasty Bonus Bet

A novel bonus bet is disclosed, which for convenience is referred to herein as the "Dynasty Bonus Bet." The Dynasty Bonus Bet is a wager that allows a player to bet that his 7-card hand will contain a three-of-a-kind (labeled as "Trips" in the table below) or higher. If the player is not dealt a 7-card hand containing a three-of-a-kind or higher, he loses the bet. If the player is dealt a 7-card hand containing a three-of-a-kind or higher, he is paid according to Table 5 below. The Dynasty Bonus Bet may include an "Envy Bonus Feature" whereby any player betting a predetermined amount, such as $5, receives a payout whenever another player participating in the same Game obtains a four-of-a-kind or higher.

TABLE 9

| Hand | Combinations | P (Hand) | Payout | Value | Envy Odds | Envy Value | Envy$ |
|---|---|---|---|---|---|---|---|
| Losing combinations | 124556196 | 0.808 | −1 | −0.808 | 0 | 0 | $0.00 |
| Trips | 7672500 | 0.0498 | 3 | 0.149 | 0 | 0 | $0.00 |
| Straight | 11034204 | 0.072 | 2 | 0.143 | 0 | 0 | $0.00 |
| Flush | 6172088 | 0.0400 | 4 | 0.160 | 0 | 0 | $0.00 |
| Full House | 4188528 | 0.027 | 5 | 0.136 | 0 | 0 | $0.00 |
| Four-of-a-Kind | 307472 | 0.002 | 25 | 0.050 | 1 | 0.002 | $5.00 |
| Straight Flush | 180324 | 0.001 | 50 | 0.059 | 4 | 0.005 | $20.00 |
| Royal Flush | 26020 | 0.000 | 120 | 0.020 | 10 | 0.002 | $50.00 |
| A-5 Natural Straight Flush | 4308 | 0.000 | 120 | 0.003 | 15 | 0.000 | $75.00 |
| Five Aces | 1128 | 0.000 | 500 | 0.004 | 20 | 0.000 | $100.00 |
| Seven-Card Wild Straight Flush | 196 | 0.000 | 1000 | 0.001 | 40 | 0.000 | $200.00 |
| Royal Flush With (Natural) AQ Suited | 72 | 0.000 | 1000 | 0.000 | 80 | 0.000 | $300.00 |
| Seven-Card Natural Straight Flush | 32 | 0.000 | 2000 | 0.000 | 100 | 0.000 | $400.00 |
| A-5 Natural Straight Flush With AQ Suited | 12 | 0.000 | 2000 | 0.000 | 60 | 0.000 | $500.00 |
| Total: | 154143080 | 1 | | −0.082 | | 0.000 | |
| Solo Player Return | −8.16% | | | | | | |
| Max Value of Envy Bonus Feature | 4.52% | | | | | | |
| Optimal Multiple Player Return | −3.64% | | | | | | |

The Dynasty Bonus Bet is independent of the main bet, in other words, the player can win or lose the Dynasty Bonus Bet without regard to whether the player won or lost the main bet. A novel element of the Dynasty Bonus Bet is that it pays 120:1 on an ace through 5 natural straight flush (natural, meaning, without the use of a joker). A further novel element of the Dynasty Bonus Bet is that it pays out 1,000:1 on a royal flush when the hand additionally contains a natural A-Q of same suit for the short side. Yet a further novel element of the Dynasty Bonus Bet is that it pays out 2,000:1 on an ace through 5 natural straight flush, without the use of a joker, and the hand additionally contains a natural A-Q of same suit for the short side.

ii. Pai Gow Protection Bet

A novel protection bet is disclosed, which for convenience is referred to herein as the "Pai Gow Protection Bet." The Pai Gow Protection Bet is a wager that allows a player to bet that his 7-card hand will contain no poker elements aside from high-card singletons or that it will contain an A-5 natural straight flush. If the player is not dealt such a 7-card hand, he loses the bet. If the player is dealt such a 7-card hand, he is paid according to Table 10 below.

The Pai Gow Protection Bet is independent of the main bet, in other words, the player can win or lose the Pai Gow Protection Bet without regard to whether the player wins or loses the main bet. A novel element of the Pai Gow Protection Bet is that it pays 100:1 on an ace through 5 natural straight flush. A further novel element of the Pai Gow Protection Bet is that it pays out an additional bonus based on the rank of the higher "kicker" card (meaning the highest card outside of the ace through 5 natural straight flush) as set forth below in Table 10:

TABLE 10

| Hand | Combinations | P(Hand) | Payout | Value |
|---|---|---|---|---|
| Losses | 129,358,340 | 0.8392 | −1 | −0.8392 |
| A-High Pai Gow | 14,430,780 | 0.0936 | 3 | 0.2809 |
| K-High Pai Gow | 6,386,940 | 0.0414 | 5 | 0.2072 |
| Q-High Pai Gow | 2,719,500 | 0.0176 | 7 | 0.1235 |
| J-High Pai Gow | 963,480 | 0.0062 | 15 | 0.0937 |
| 10-High Pai Gow | 248,640 | 0.0016 | 25 | 0.0403 |
| 9-High Pai Gow | 31,080 | 0.0002 | 100 | 0.0202 |
| A-5 Natural Straight Flush + A-High Kicker | 540 | 0.0000 | 103 | 0.0004 |
| A-5 Natural Straight Flush + K-High Kicker | 664 | 0.0000 | 105 | 0.0005 |
| A-5 Natural Straight Flush + Q-High Kicker | 600 | 0.0000 | 107 | 0.0004 |
| A-5 Natural Straight Flush + J-High Kicker | 536 | 0.0000 | 115 | 0.0004 |
| A-5 Natural Straight Flush + 10-High Kicker | 472 | 0.0000 | 125 | 0.0004 |
| A-5 Natural Straight Flush + 9-High or Less Kicker | 1,508 | 0.0000 | 200 | 0.00196 |
| Total: | 154,143,080 | 1 | | −6.95% |

In another embodiment, the Pai Gow Protection Bet is the same as above, except that the ace through 5 natural straight flush pays out 120:1 regardless of the kicker card.

iii. Queen's Dragon Bet

A novel dealer push bet is disclosed, which for convenience is referred to herein as the "Queen's Dragon Bet." The Queen's Dragon Bet is a wager that allows a player to bet that the dealer will push all main bets on a dealer's queen-high pai gow hand (for versions of the Game that push the main bet on a dealer's queen-high pai gow hand). If the dealer pushes the main bet on a queen-high pai gow hand, the player wins the bet. If the dealer does not push the main bet on a queen-high pai gow hand, the player loses the bet. A novel element of the Queen's Dragon Bet is that it pays 45:1 on a dealer's queen-high pai gow hand.

iv. Jack's Dragon Bet

A novel dealer push bet is disclosed, which for convenience is referred to herein as the "Jack's Dragon Bet." The Jack's Dragon Bet is a wager that allows a player to bet that the dealer will push all main bets on a dealer's jack-high or lower pai gow hand (for versions of the Game that push the main bet on a dealer's jack-high or lower pai gow hand). If the dealer pushes the main bet on a jack-high or lower pai gow hand, the player wins the bet. If the dealer does not push the main bet on a jack-high or lower pai gow hand, the player loses the bet. A novel element of the Jack's Dragon Bet is that it pays 100:1 on a dealer's jack-high or lower pai gow hand.

In a preferred embodiment, the Game includes one or more of the above-described proposition bets. However, it may be understood that none of the proposition bets are necessary to the Game, and should not be read as limiting the disclosure in any way.

2. Table Layouts

According to FIG. 9, in an embodiment of a gaming table layout 100 (hereinafter "layout") for the Game, the layout comprises a dealer location 10 (denoted "Dealer" in FIG. 9) and at least one player location 20 (denoted "Player" in FIG. 9). Furthermore, the layout 100 may comprise a wagering region 22 generally located proximate to each player's location 20. Without limiting the disclosure, the wagering region 22 has been depicted in FIG. 9 with the letter M denoting the main bet. In versions of the Game where a player is the banker, a marker (not shown in FIG. 9) may be placed proximate to the designated player banker location. In this manner, such player banker may be visually known to other players. Of course, one or more than one players may play the Game, and only one player will be located at each player location 20.

Referring further to FIG. 9, the layout 100 may further comprise a long side region (shown as "H" for "high" in FIG. 9) 24*a* configured to receive the 5-card long side of a hand, and a short side region (shown as "L" for "low" in FIG. 9) 24*b* configured to receive the 2-card short side of a hand, with each of the long side and short side portions located proximate to both each of the player locations 20 and the dealer location 10 for convenience of visibility and association with the dealer and players.

Again, with reference to FIG. 9, the layout 100 may further comprise one or more table instructions 26 shown, for example, as "All Hand's Push on Dealer's Jack-High or Less" or any other suitable table instructions regarding play of the Game to inform players regarding certain rules of the Game and the kind of game being offered. Further, the layout 100 may comprise an identification notice 28 notifying players of certain specific information regarding the originator of the Game being played and any other information that pertains to the Game. Of course, the layout 100 may further have a marking that specifically identifies any proprietary rights data (or informational label) 30 relating to the Game being played. Further, the layout 100 may comprise one or more payout tables 32 (one shown in FIG. 9), so that players may be informed of the payouts being paid during settlement of wagers during the Game in conformance to a gaming establishment's payout rules.

Referring again to FIG. 9, in yet another aspect of the layout 100, the dealer may shuffle a deck of playing cards by hand or, as depicted, the dealer may make use of a shuffling device 34.

In yet another aspect of the layout 100, another aid to the dealer may include a chip rack (or chip holder, token rack or token holder) 36 (shown in FIG. 9B, but not in FIG. 9A) used by the dealer to provide and receive wager exchanges or settlements (wins/losses) during the course of the Game to be banked or paid out by the dealer and/or designated player banker. The chip rack 36 may include a plurality of tokens 36*a* of varying denominations and a currency holder 36*b* for depositing at least one currency equivalent tendered by the player to the dealer in exchange for tokens of the chip holder 36. The currency equivalent may be any form of monetary currency such as notes, checks, vouchers, coins and the like which may be deposited in the currency holder 36*b* by the dealer in exchange for the tokens. Thus the currency holder 36*b* functions as a safety deposit box which may be cleared out by a gaming establishment as desired.

Figure 9A:
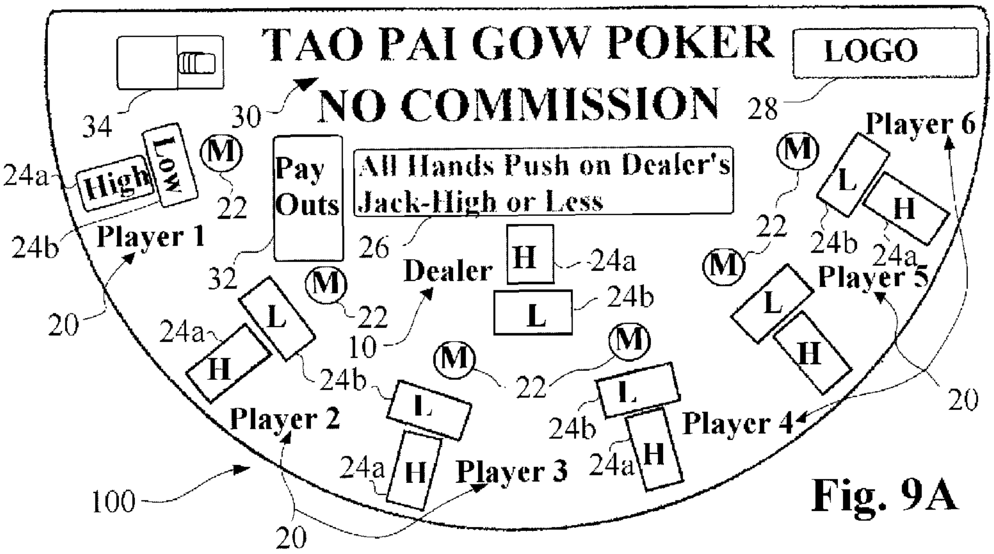
FIG. 9A is a top plan view of a table layout for an embodiment of the Game.
Figure 9B:
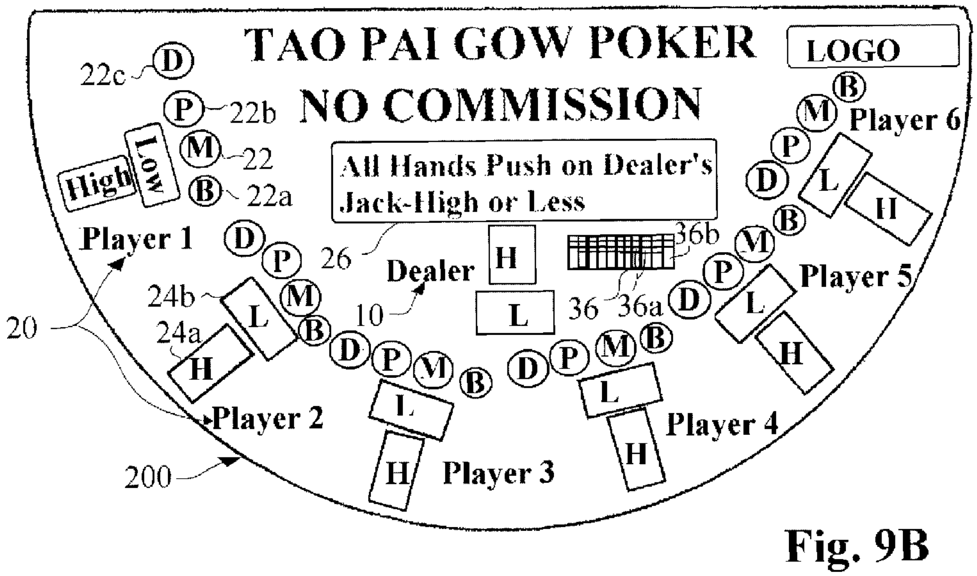
FIG. 9B is a top plan view of a table layout for another embodiment of the Game showing proposition bets such as bonus bets and protection bets.

Referring now to FIG. 9B, another embodiment of a layout 200 reveals substantially the same features as the layout 100 (see FIG. 9A and description above). However, without limiting the disclosure, in addition to the specific features of the layout 100 with the main (first) wagering region 22, the layout 200 may further comprise a bonus wagering (second wager) region 22*a* (marked "B" in FIG. 9B) and a protection or insurance (third) wagering region 22*b* (marked "P" in FIG. 9B) as discussed in the Terminology Section above.

Figure 9C:
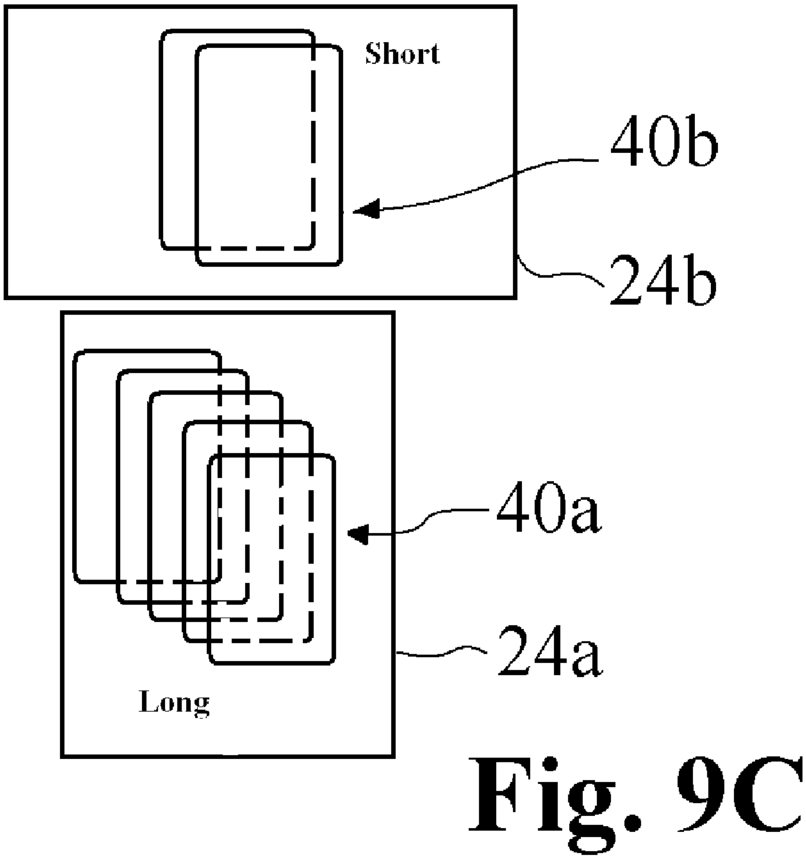
FIG. 9C is an exploded top plan view showing a region of a player location of FIG. 9A or FIG. 9B with a pair of playing cards located in a portion of the region depicted as "Short" and with five playing cards located in a portion of the region depicted as "Long."

FIG. 9C depicts an exploded top plan view of the card placements of the long side and short side for the players.

Figure 9D:
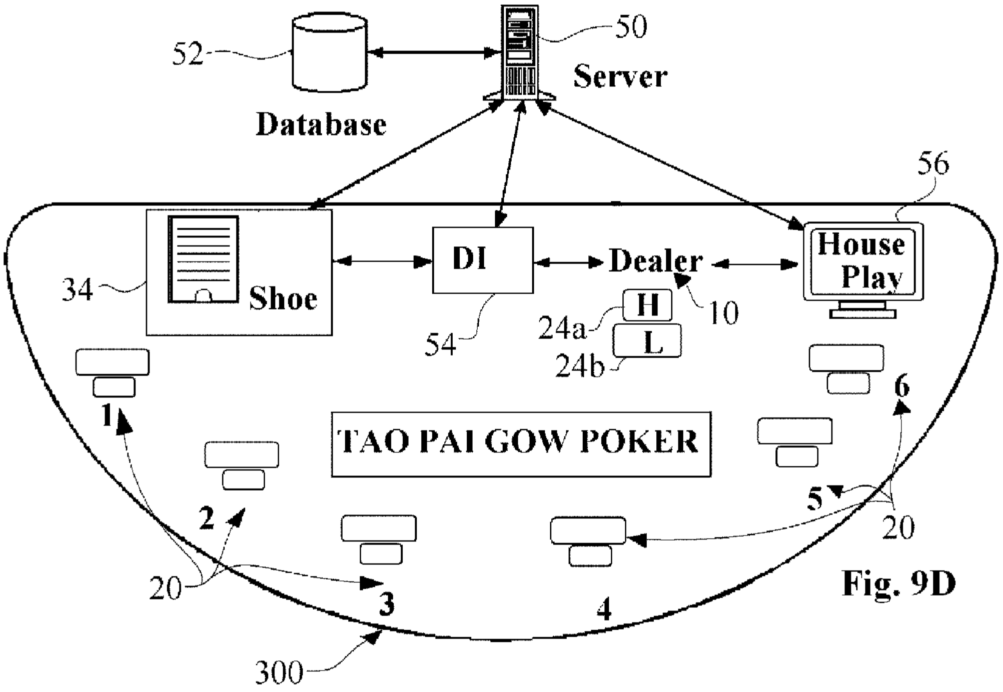
FIG. 9D depicts aspects of the Game of either FIG. 9A or 9B configured to communicate with a server system coupled to various elements of the gaming table.

FIG. 9D depicts aspects of the Game of either of FIG. 9A or 9B when configured in communication with one or more servers 50 (one shown in FIG. 9D) and one or more databases 52 (one shown in FIG. 9D) of a server system coupled to various elements of a layout 300 such as those shown in any of the layouts 100, 200 as described above with respect to FIGS. 9A and 9B. The server may be coupled to the shuffling device (also termed a shoe) 34, a dealer interface 54 to allow input/output of information entered or received by the dealer during play of one or more rounds of the Game. As shown in FIG. 9D, the dealer may also interact with a display device 56 showing various house ways of arranging pai gow poker hands and/or other information pertinent to playing the Game. Of course, the display device 56 could be a self-contained computer system or simply an input/output display device coupled to the server 50 as desired. It should be understood that such server systems may be typical of various systems used by gaming establishments to monitor flow of any wagering table and provide information to either the dealer and/or the players as desired. The dealer may be consulted by any of the players to arrange the players' hands so that, in some respects, the Game may be reasonably transparent regarding playing strategies. However, if players play against each other in versions where a player is the banker, then such transparency may be undesirable. Such communication technology using servers may also be available for machine-oriented wagering games whether by way of wired or wireless methods as is understood in the art. Furthermore, it is understood that the Game may be offered as one or more non-wagering computer games available on various media as software as is known in the art.

Figure 9E:
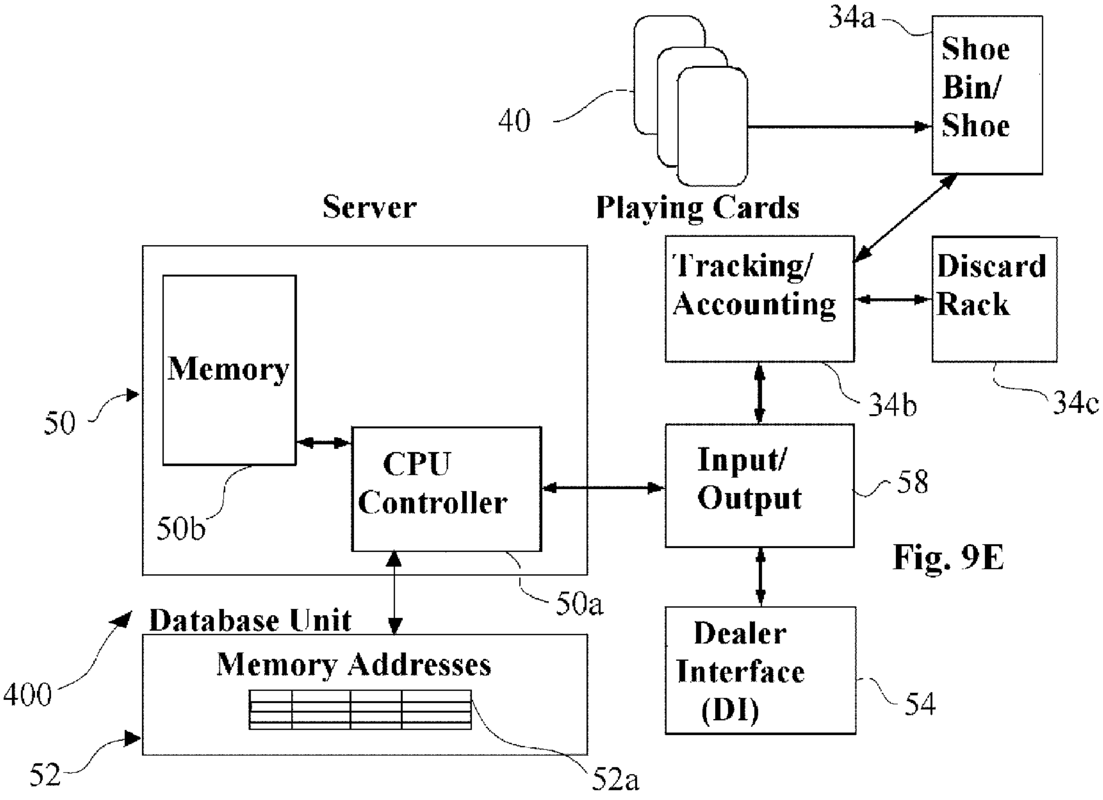
FIG. 9E depicts a schematic view showing a portion of the server system configured to verify which playing cards have been dealt from a shuffling device as shown in FIG. 9D during play of the Game of either FIG. 9A or 9B.

Without limiting the disclosure, FIG. 9E depicts a schematic view showing a portion of the server system (see description above and FIG. 9D) associated with a playing card verification server (hereinafter "shuffler verifier") 400. The shuffler verifier 400 may be configured to verify which playing cards have been dealt from a shuffling device 34 comprising a shoe bin 34*a*, tracking accounting firmware or software (hereinafter "tracking module") 34*b* that may be incorporated in one or more logic and/or memory chips (not shown) and a discard rack 34*c* during play of the Game versions of either FIG. 9A or 9B. Specifically, as illustrated in FIG. 9E, when the dealer stacks the shoe bin 34*a* with a deck of playing cards 40, one or more detectors (not shown) of the shoe bin 34*a* recognize (by means of an energy detector such as infrared, visible, UV and the like) that the playing cards have been loaded. In addition, as one or more playing cards 40 are dealt by the dealer to the players, the one or more detectors may read the playing cards and record (by means of one or more random access memory chips) which playing cards had been dealt using the tracking module 42*b*. As is known in the art, the tracking module 42*b* may be in-built circuitry of the shuffling device 34 in communication with accounting software as desired. Similarly, the tracking module 42*b* may account for any of the playing cards 40 that have been discarded rather then dealt into the discard rack 34*c*.

In a further aspect of the shuffler verifier 400, the tracking module 42*b* may be in communication with one or more input/output modules 58 to permit the dealer to verify that a legitimate shuffling operation had been made. A playing card shuffling operation that is illegitimate may be voided as may be posted on a display device (not shown in FIG. 9E but shown in FIG. 9D), such as a monitor or a light (not shown in FIG. 9D or 9E) that flashes to inform players regarding the integrity of the playing card shuffling operation. In other aspects, the input/output modules 58 may communicate with one or more input/output modules of the server 50 (shown coupled to a CPU unit 50*a*, although not limited to a single CPU as is understood in the art) to record data such as which playing cards 50 had been dealt to which specific player in order to permit review of any disputed Game hands. As would be understood, the input/output modules 58 may be in communication with a dealer interface 54 comprising one or more keyboards, mice, pointing devices, tablets and other peripherals such as memory sticks, disk drives, tapes and the like to permit human interaction using the dealer interface (DI) (see description above with respect to FIG. 9D) within the shuffler verifier 400. Of course, input/output modules 58 may include integrated circuit boards having circuitry as is understood in the art to permit flow of communications between at least two devices.

In yet another aspect, the CPU (central processing unit) 50*a* of the server 50 may be coupled to memory 50*b* comprising internal dynamic random access and/or internal flash memory (termed "bios" and other memory chips with relatively "static or fixed memory" components known as "firmware" or having had other similar designations) as understood in the art that allows the server to carry out increasingly complex computing tasks. As depicted in FIG. 9E, the server's CPU 50*a* may also be coupled to one or more other peripheral units such as the database unit 52 depicted in FIG. 9D as a disk stack. Of course, and without limiting the disclosure, there are multiple other storage database units known in the art, such as flash memory, magnetic tape, CDs and DVDs, hard disks, floppy disks and the like. Naturally, such peripheral units may comprise one or more other server input/output devices (not shown) to permit human interaction with a remote server (a CPU-based system and the like as understood in the art). As depicted in FIG. 9E, the database unit 52 may comprise one or more memory addresses 52*a* that comprise appropriate data that may be accessed by the CPU 50*a* as desired. Such access by the CPU 50*a* may be both to dynamic and fixed memory addresses located within the database unit

52 as is understood in the art. Of course, there may be one or more database units 52 accessible by the CPU 50*a*.

Without limiting the disclosure, in some gaming jurisdictions and gaming establishments, it may be possible that the wagering chips (see the chip rack 36 having wagering chips or "tokens") that may comprise "smart circuitry" coupled to a region located proximate to one or more player locations and the dealer location 10. In this manner, a gaming establishment may account for all wagering chips using other aspects of the server 50 based on technologies such as radio frequency identification devices (RFID) (not shown) and the like as is known in the art. Furthermore, other peripheral devices such as magnetic strip readers, bar code readers, optical character readers, radiofrequency device readers and the like may be coupled to the server 50 to provide marketing information to a gaming establishment so that the gaming establishment may follow up with one or more players when the player uses the gaming establishment's recognized player identification device. Currently, in many gaming establishments such player identification devices often have the appearance of a credit card and may provide the player with various rewards and compensations to encourage game play with the gaming establishment. Naturally, the identification devices may be usable in one or more gaming establishments depending on the network of gaming establishments participating in marketing programs offered by the network of gaming establishments as is known in the art.

3. Mechanical Devices to Implement a Desired House Way Setting

Figure 10:
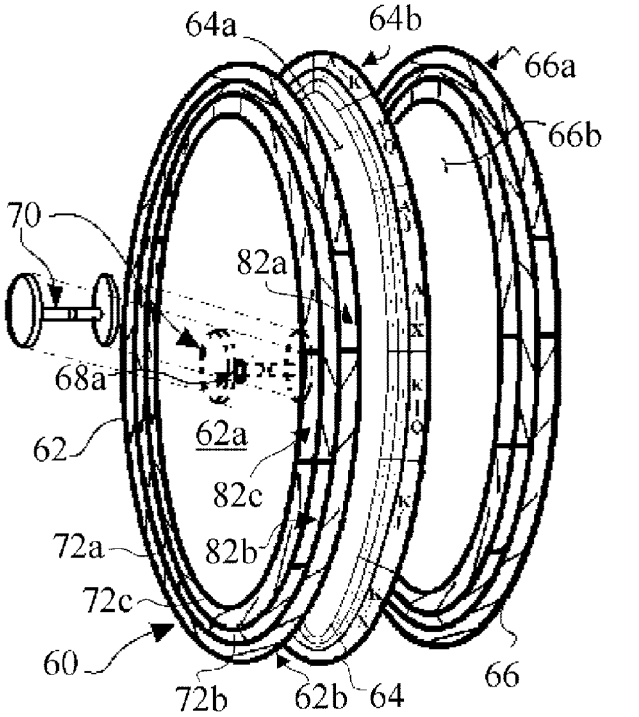
FIG. 10 is an exploded front perspective view of a mechanical device configured to implement an exemplary house way set for the Game.

FIG. 10 depicts an exploded front perspective view of a mechanical device 60 (the "mechanical device") configured to implement the first of the four house way sets for the Game described in paragraph 91 above, as an example of such a device as disclosed herein. It may be understood that the mechanical device may be differently configured to implement any desired house way setting for any card-based casino table game. Even though the mechanical device 60 as depicted in FIG. 10 has a wheel-shape or substantially circular shape, it should be understood that the specific shape has no bearing on the functionality of this device. Since players may request help from a dealer during play of a casino table game, players may also use the mechanical device 60 depending on a gaming establishment's policies concerning same.

Referring further to FIG. 10, the mechanical device 60 comprises a first overlay member 62 having a first side 62*a* (see also FIG. 10C and the description below) and a second side 62*b* (details not shown), a base (or playing card arrangement) member 64 having a first side 64*a* (see also FIGS. 10D and 10E and the description below and a second side 64*b* (not shown in FIG. 10, but see FIG. 10F and the description below), and a second overlay member 66 having a first side 66*a* (see FIG. 10D and the description below) and a second side 66*b* (details not shown). Without limiting the disclosure, each of the first overlay member 62, the base member 64 and the second overlay member 66 have been depicted as being substantially circularly shaped. Each of the first overlay member 62, the base member 64 and the second overlay member 66 have a corresponding opening 68*a*, 68*b*, 68*c* (only the opening 68*a* is shown in FIG. 10, but FIGS. 10A, 10B, 10C, 10D, 10E and 10F show all the openings) in the nature of a centrally-placed pivot hole. The openings 68*a*, 68*b*, 68*c* may be located at substantially a central region of each of the members 62, 64, 66, so that each of the members may be aligned in registration to one another when configured with a mechanical fastener 70 (see further description below). This permits either of the overlay members 62 or 66 to be rotated relative to the base member 64. Thus each of the members 62, 64, 66 may be pivotally coupled by means of the mechanical fastener (pin, threaded nut and bolt, rivet and the like) 70 to permit rotational alignment of the first overlay member 62 over the first side 64*a* of the member 62, and rotational alignment of the second overlay member 66 over the second side 64*b* of the member 64. The positioning of the mechanical fastener 70 within the mechanical device 60 is shown in phantom lines in FIGS. 10C and 10D (and with dotted lines in FIGS. 10A, 10B, 10C and 10D).

Of course, in other aspects of the disclosure, it is understood that the mechanical device 60 could be configured as two separate mechanical devices 60*a*, 60*b* (not shown) as desired. Thus, each of the mechanical devices 60*a*, 60*b* would have an overlay member and a base member together with a fastener associated with specific playing card arrangements shown for each respective mechanical device.

Figure 10A:
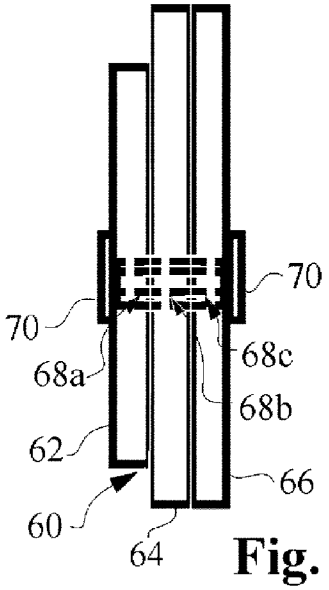
FIG. 10A is a side elevation view of the mechanical device of FIG. 10 according to an embodiment of the invention.
Figure 10B:
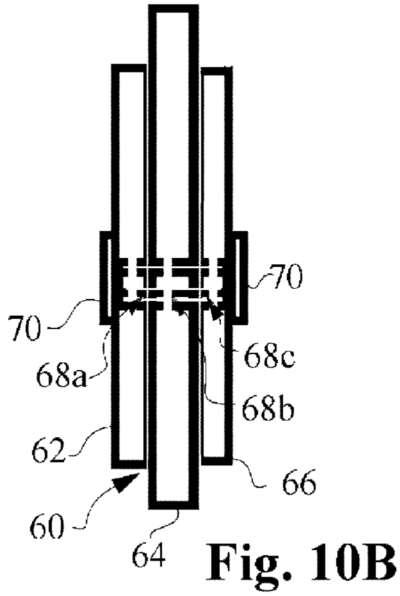
FIG. 10B is a side elevation view of the mechanical device of FIG. 10 according to an embodiment of the invention.

FIG. 10A is a side elevation view of the mechanical device 60 wherein the first overlay member 62 has a diameter less than that of the base member 64. Furthermore, the second overlay member 66 is depicted as having a diameter substantially equal to the diameter of the base member 64. Similarly, FIG. 10B is a side elevation view of an alternative embodiment of the mechanical device 60 wherein the first overlay member 62 has a diameter less than that of the base member 64 and the second overlay member 66 is depicted as having a diameter less than the diameter of the base member.

Of course, without limiting the disclosure, it is understood that in this configuration (see FIG. 10B) the first overlay member 62 and the second overlay member 66 may have substantially equal diameters although they could be of different diameters as desired.

Figure 10C:
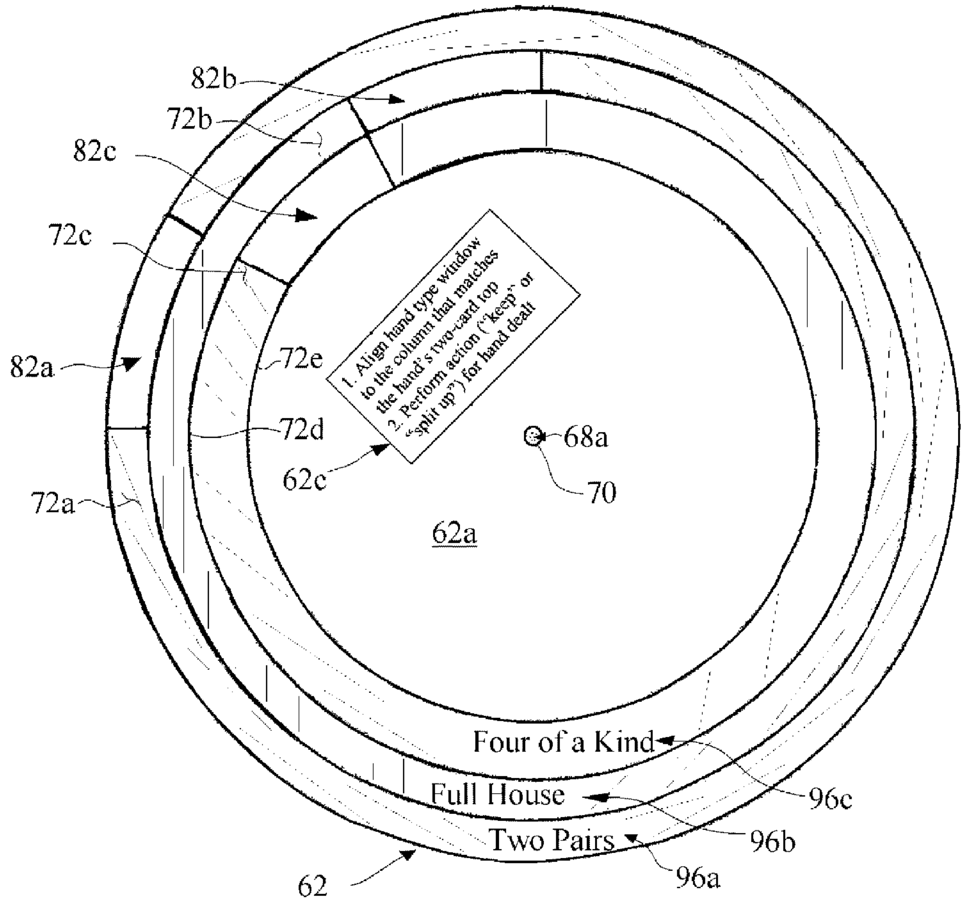
FIG. 10C is a front elevation view of a first side of an overlay member of the mechanical device of FIG. 10.
Figure 10D:
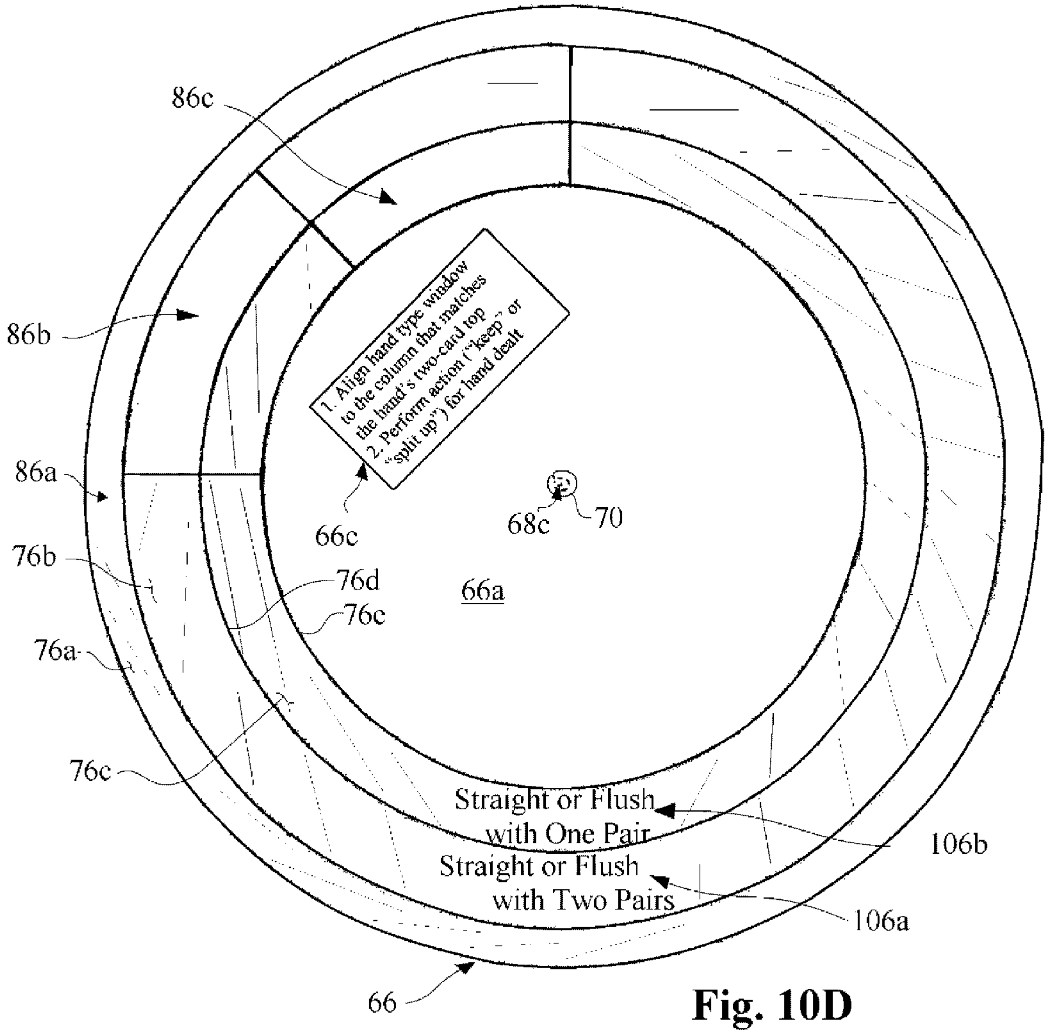
FIG. 10D is a front elevation view of a first side of a second overlay member of the mechanical device of FIG. 10.
Figure 10E:
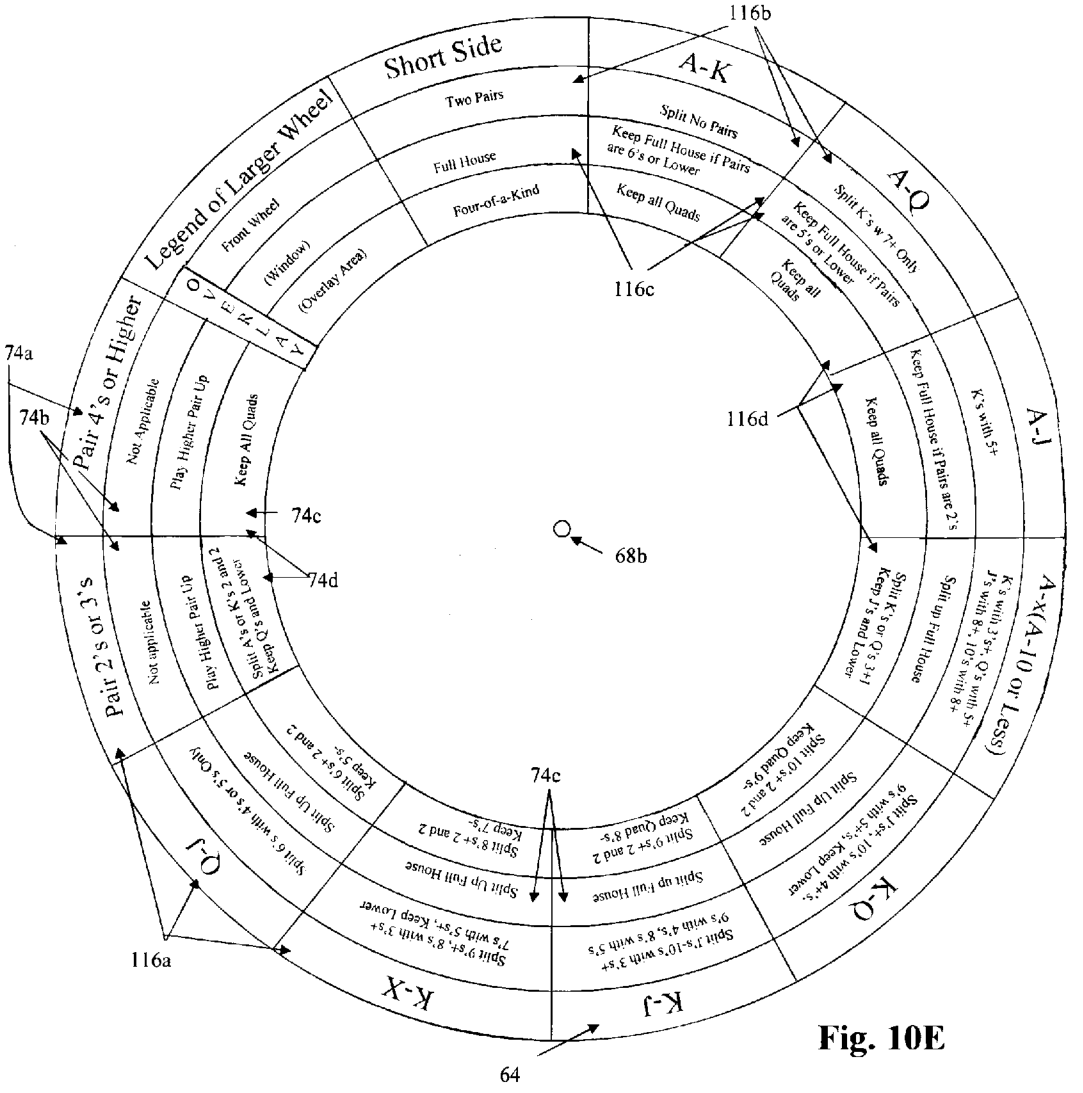
FIG. 10E is a front elevation view of a first side of a playing card arrangement member of the mechanical device of FIG. 10 wherein the first side of the playing card arrangement member is configured beneath a back side of the first overlay member of FIG. 10C of the mechanical device of FIG. 10.

FIG. 10C is a front elevation view of a first side (or front side) 62*a* of the overlay member 62 of the mechanical device 60 shown in FIG. 10 (see description above). Naturally, a second side or opposite side or back side 62*b* (not shown) of the overlay member 62 may have any desired features (not described or shown herein). As shown in FIG. 10C, an outer portion of a surface of the first side 62*a* of the first overlay member 62 has first, second and third substantially concentric first overlay member ring segments 72*a*, 72*b*, 72*c* radiating out from a substantially centrally located opening 68*a* of the first overlay member. As depicted a portion of the surface of the first overlay member's 62 ring segment 72*a* is located substantially proximate to the periphery of the first overlay member 62. Similarly, a portion of the surface of the first overlay member's second ring segment 72*b* is closer to a central portion of the surface of the side 62*a*, and a side of the second ring segment is adjacent to a side of the first ring segment 72*a*. Similarly, a side of the third ring segment 72*c* is adjacent to an opposite side of the second ring segment 72*b* and the third ring segment lies closer to the central opening 68*a* of the first overlay member 62 than does the second ring segment.

According to FIG. 10C, a portion of the first ring segment 72*a* has a first identifier 96*a* depicted as "Two Pairs" located within a portion of the surface of the first ring segment. Similarly, a portion of the second ring segment 72*b* has a second identifier 96*b* depicted as "Full House" and the third ring segment 72*c* has a third identifier 96*c* depicted as "Four-of-a-Kind." Of course, it is understood that this specific ordering of the first overlay member's 62 ring segments 72*a*, 72*b*, 72*c* could be re-arranged as desired. Further, a portion of the first ring segment 72*a* has a first arch-like opening (or first slit or first window) 82*a* substantially defined by a portion of a side, an opposite side and two radial sides of the ring segment 72*a*. In other words, the first window 82*a* has a substantially arch-like segmental shape (although it could be a different shape as desired). The second ring segment 72*b* has a second window opening (or second slit) 82*b*, and the third concentric ring segment 72*c* has a third window opening (or third slit) 82*c*. The three window openings 82*a*, 82*b*, 82*c* in combination with portions of the base 64 would permit a user of the mechanical device 60 to view one or more data fields 116*b*, 116*c*, 116*d* (see FIG. 10E and the description below). These data fields 116*b*, 116*c*, 116*d* would guide how a dealer's or player's long side of the hand should be arranged with respect to the two cards remaining that will comprise the short side of his hand as shown in FIG. 10E. As depicted with reference to FIG. 10E, the three window openings 82*a*, 82*b*, 82*c* are in visual communication with one or more base member sectors 74*b*, 74*c*, 74*d* of the first side 64*a* of the base member 64.

In operation, the user first refers to the ring segment window 82*a*, 82*b*, 82*c* that corresponds to his hand type, e.g., "Two Pairs," "Full House" or "Four-of-a-Kind." The user then rotates the overlay segment 62 to align this window to the description of the two remaining singleton cards comprising the user's short side, which descriptions are displayed on the periphery of the base member 64, side 64*a*. This will cause the window 82*a*, 82*b* or 82*c*, as the case may be, to display a data field 116*b*, 116*c* or 116*d* printed on the base member 64, side 64*a*. The data field 116*b*, 116*c* or 116*d* directs the user to the proper handling of his hand type as per the instant disclosure.

Turning now to other features shown in FIG. 10C, a portion of the surface of the front side 64*a* of the first overlay member 64 has one or more instructions of a first instruction data set 62*c* (shown in a box) that could indicate to a user how the first overlay member should be aligned relative to the front or first side 64*a* of the base member 64.

Figure 10F:
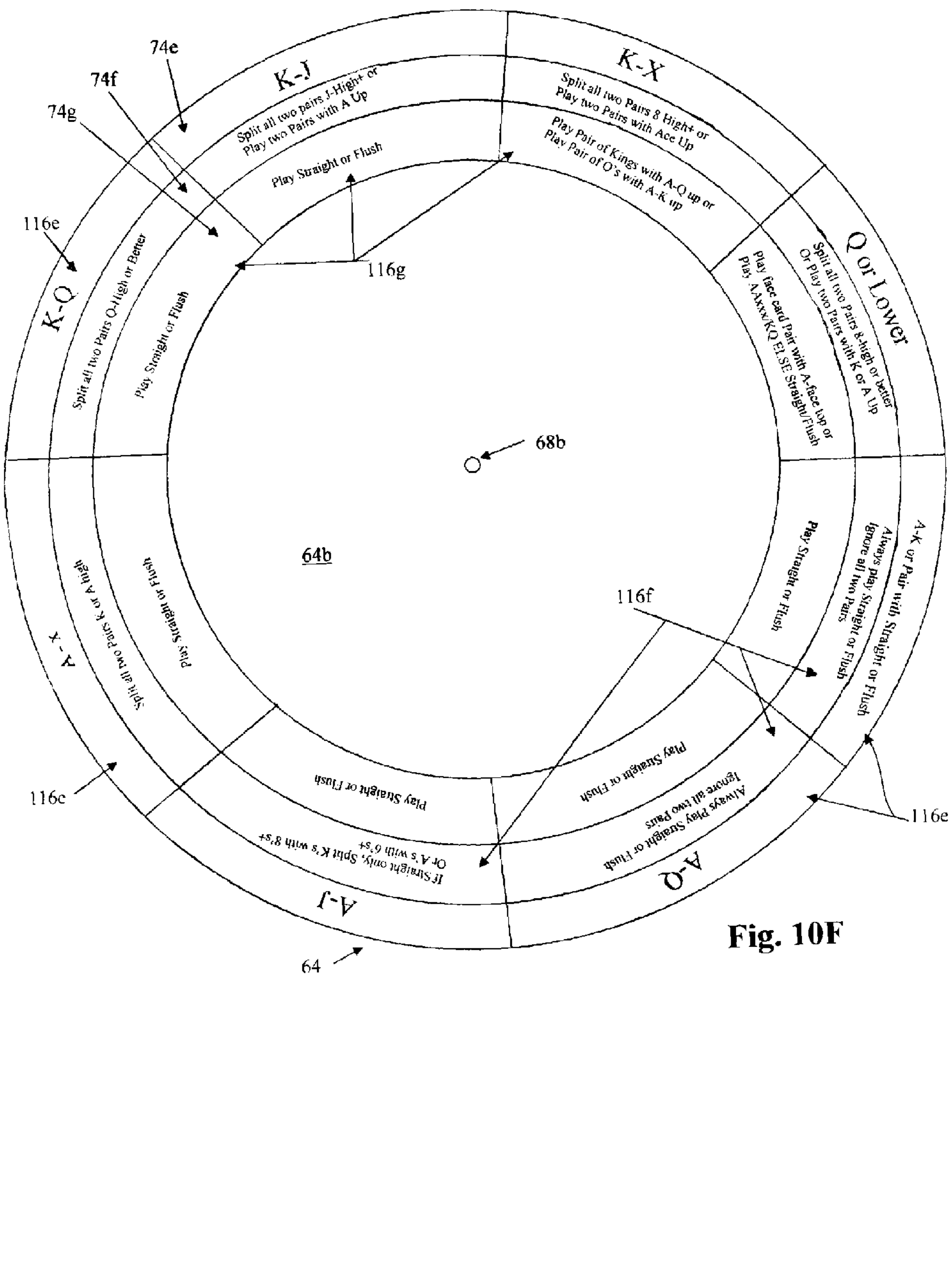
FIG. 10F is a front elevation view of a second side of a playing card arrangement member of the mechanical device of FIG. 10 wherein the second side of the playing card arrangement member is configured beneath a back side of the second overlay member of FIG. 10D of the mechanical device of FIG. 10.

To enable processing of more hand types, the reverse side of the mechanical device may be configured similarly to the front side. In an embodiment, for example, the reverse side may be configured as shown in FIGS. 10D and 10F, where FIG. 10D depicts the overlay member and FIG. 10F depicts the base member.

FIG. 10D depicts a front elevation view of a first side (or front side) 66*a* of the second overlay member 66 of the mechanical device 60 shown in FIG. 10 (see description above). Just as for the first overlay member 62 a second (or back or opposite) side 66*b* is not shown or described (see description above of the back side 62*b* of the first overlay member).

Referring now to other features of the second overlay member 66 depicted in FIG. 10D, it may be seen that a portion of the surface of the second overlay member's first side 66*a* has first, second and third substantially concentric ring segments 76*a*, 76*b*, 76*c*, with each segment radiating out from a substantially centrally located opening 68*c* of the second overlay member. As depicted in FIG. 10D a first portion of the second overlay ring segment 76*a* comprises a periphery of the second overlay member 66. Further, the second overlay ring segment 76*b* is located closer to a central portion of the second overlay member 66 between the first overlay ring segment 76*a* and the third overlay ring segment 76*c*. A side of the second ring segment 76*b* is adjacent to (or comprises) an opposite side of the first ring segment 76*a*.

Similarly, a side of the third ring segment 76*c* is adjacent to (or comprises) an opposite side of the second ring segment 76*b* and the third ring segment 76*b* lies closer to the central opening 68*c* of the second overlay member 66 than does the second ring segment 76*b*. According to FIG. 10D, a portion of the first ring segment 76*a* has no identifier, but instead may be substantially transparent, translucent or merely decorative as desired and may be described as the first ring segment's window opening (or sector) 86*a* merely for ease of understanding. In contrast, the second ring segment 76*b* has a first identifier 106*a* depicted as "Straight or Flush with Two Pairs" located within a portion of the surface (or sector) of the second ring segment 76*b*. Similarly, a portion of the third ring segment 76*c* has a second identifier 106*b* depicted as "Straight or Flush with One Pair" located in a sector of the third ring segment. Of course, it is understood that this specific ordering of the second overlay member's ring segments 76*a*, 76*b*, 76*c* could be re-arranged as desired. Further, a portion of the second ring segment 76*c* has a first window opening (or first slit or sector) 86*b* substantially defined by a first side of an arc, a second side of an arc and two radial elements to provide an arcuate shape (although it could be a different shape as desired). The overlay member's third ring segment 76*c* has a second window opening (or second slit or sector) 86*c*. The substantially transparent first window opening 86*a* of the ring segment 76*a* and both window openings 86*b*, 86*c* permit a user of the mechanical device 60 to view one Or more data fields (or addresses) 116*e*, 116*f*, 116*g* (see FIG. 10F and the description below). These features show how to best arrange a user's long side in view of the user's short side combinations illustrated in FIG. 10F as one or more data fields (or addresses) of a second or opposite side 64*b* of the base member 64. As depicted in FIG. 10D, the outer overlay ring segment 76*a* and both window openings 86*b*, 86*c* would be in visual communication with one or more base member sectors 74*e*, 74*f*, 74*g* of the second side 64*b* of the base member 64 of FIG. 10F.

With reference to the back side of the mechanical device 60, in operation, the user first refers to the ring segment window 86*a*, 86*b*, 86*c* that corresponds to his hand type, e.g., "Straight or Flush With Two Pairs" or "Straight or Flush With One Pair." The user then rotates the overlay segment 66 to align this window to the description of the two remaining singleton cards comprising the user's short side when viewing the seven-card hand by its longest element(s) that give the strongest possible two-card short side, which descriptions are displayed on the periphery of the base member 64, side 64*b*. This will cause the window 86*b* or 86*c*, as the case may be, to display a data field 116*f* or 116*g* printed on the base member 64, side 64*b*. The data field 116*f* or 116*g* directs the user to the proper handling of his hand type as per the instant disclosure.

Turning now to other features shown in FIG. 10D, a portion of the surface of the front side 66*a* of the second overlay member 66 has a second instruction set 66*c* (shown in a box) that indicates to the player or dealer how the second overlay member may be aligned relative to the back or second side 64*b* of the base member 64 of FIG. 10F.

FIG. 10E is a front elevation view of a first side 64*a* of a playing card arrangement (or base) member 64 of the mechanical device 60. In practice, the first side 64*a* of the base member 64 may be configured beneath the first overlay member 62 (also described above with respect to FIG. 10C and also shown in FIG. 10). A portion of the surface of side 64*a* of the base member 64 comprises four substantially concentric ring segments 74*a*, 74*b*, 74*c*, 74*d* with each of the ring segments having a plurality of ring sectors. As depicted in FIG. 10E, each of the ring sectors of the concentric ring segments 74*a*, 74*b*, 74*c*, 74*d* has corresponding address information 116*a*, 116*b*, 116*c*, 116*d* used in conjunction with the window openings of the first overlay member (described above with respect to FIG. 10C). For instance, some of the address information 116*a* may be "K-X, Q-J, Pair 2's or 3's," etc. located within separate sectors of the ring segment 74*a*.

These refer to a user's short side arrangement when viewing the seven-card hand by its longest element(s) that give the strongest possible short side. For reference purposes FIG. 10E includes a legend of one embodiment of the base member 64 to be used in combination with the first overlay member 62 where the first overlay member's diameter would be less than that of the base member (see also FIG. 10B). Thus according to this legend entitled "Legend of Larger Wheel" marked sector as shown in FIG. 10E, this side 64*a* of the base member 64 is depicted as the "Short Side" ring segment 74*a* corresponding to the long hand side of the "Two Pairs" ring segment 74*b*, the "Full House" ring segment 74*c* and the "Four of a Kind" ring segment 74*d*. Consequently, a user may be guided as to how to optimally arrange his seven-card hand into a short side and a long side as described above with respect to the first overlay member 62 of FIG. 10C.

FIG. 10F is a front elevation view of a second or opposite side 64*b* of the playing card arrangement member (base member) 64 of the mechanical device 60 of FIG. 10. In practice, the second side 64*b* of the base member 64 may be configured beneath the second overlay member 66 as described above with respect to FIG. 10D and also shown in FIG. 10. Thus the side 64*b* would be adjacent to the opposite side 66*b* of the second overlay member 66 as shown in FIG. 10. A portion of the surface of side 64*b* of the base member 64 comprises three substantially concentric ring segments 74*e*, 74*f*, 74*g* with each of the ring segments having a plurality of ring sectors. As depicted in FIG. 10F, each of the opposite side 64*b* base member ring concentric ring segments 74*e*, 74*f*, 74*g* has corresponding address information 116*e*, 116*f*, 116*g* used in conjunction with the window openings of the second overlay member 66 as described above with respect to FIG. 10D.

For instance, some of the address information 116*e* may be "A-X, K-Q" and so on, located within separate sectors of the ring segment 74*e*. Again as described earlier with respect to FIG. 10E, for FIG. 10F these address information 116*e* sectors refer to a user's short side lookup key, which indicates how to set the user's long side when viewing the instructions through window 86*b* and 86*c*. In one embodiment, the base member's second side 64*b* may be interfaced with the second overlay member 62 depicted in FIG. 10D and also in FIG. 10 so that the second overlay member's diameter would be less than that of the base member 64 (see also FIG. 10B). In another embodiment, the base member's second side 64*b* may be interfaced with the second overlay member 62 depicted in FIG. 10D so that the second overlay member's diameter would be substantially equal to that of the base member 64 (see also FIG. 10A). Thus as shown in FIG. 10F, this second side 64*b* of the base member 64 is depicted as the ring segment 74*e* which corresponds to the short side lookup key. Further, the remaining ring segments 74*f* ("Straight or Flush with Two Pairs") and 74*g* ("Straight or Flush with One Pair") correspond to the arrangement of the long side.

It may be readily understood that the mechanical device or its electronic equivalent, as described above, may be configured for use with any playing card-based casino game. In essence, the mechanical device and its electronic equivalent can summarize the optimal strategy for a dealer or player based upon the cards dealt to the position in view of the statistics controlling the game in question. Because the combinations of cards and controlling statistics comprise too much information for the dealer or player to know by memory, the mechanical device or electronic equivalent marshal this information and permit its processing in real-time casino play.

Figure 10G:
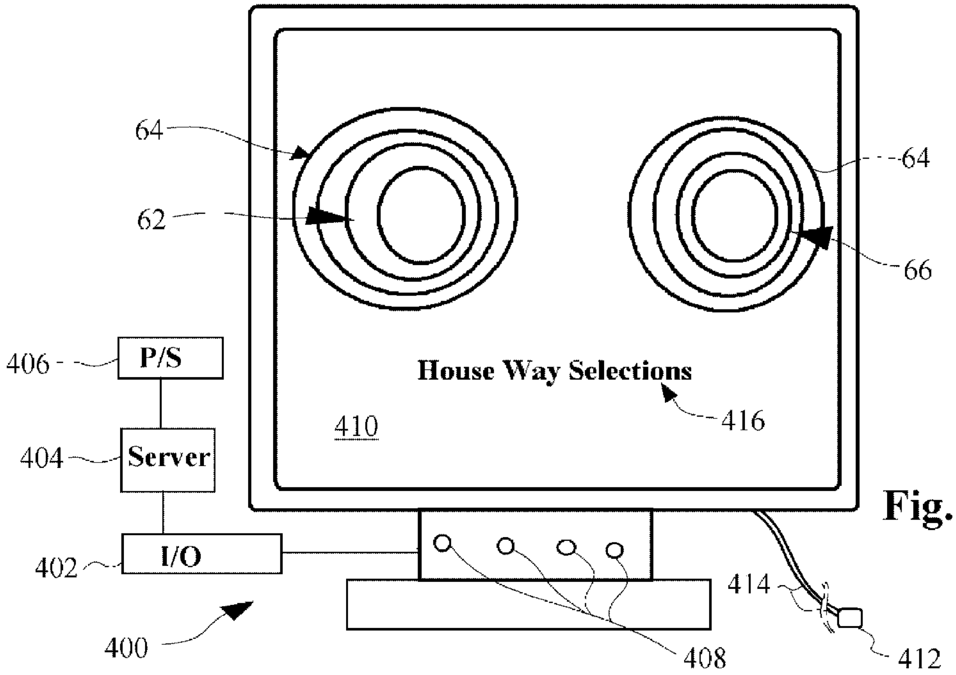
FIG. 10G is a front elevation view of a display device configured to show the first overlay of FIG. 10C with the first side of the playing card arrangement member of FIG. 10E and the second overlay of FIG. 10D with the second side of the playing card arrangement member of FIG. 10F.

FIG. 10G is a front elevation view of an electronic device comprising the mechanical device in electronic form. FIG. 10G depicts device 400 such as a monitor, that may be viewed by a dealer and optionally by one or more players.

According to FIG. 10G, the display device 400 communicates with an input/output (I/O) device 402 such as a mouse, keyboard, touch pad or the like, removable media associated with any type of disk drive, including but not limited to CD's (compact disk), DVD's (digital video device), USB drives, floppy drives and the like as is known in the art or that may be introduced to permit communication with a server system 404 such as one or more computers and the like coupled to a power supply (P/S) 406 to power up the server system. The server system 404 may be configured as a conventional computer system having programmability capabilities as is well understood in the art. Of course, the display device 400 may have adjustment members 408 to alter the appearance of a display screen 410 of the display device and the display device may be separately powered as for example with a plug 412 and cable connector 414. It may be possible that the display device 400 may be powered in other fashions as would be understood in the art. One example might be by wireless means such as infrared or radio frequency waves.

According to FIG. 10G, a portion of the display screen 410 depicts an image of the first overlay member 62 of FIG. 10C together with the first side 64*a* of the base member 64 of FIG. 10E. Furthermore, a portion of the display screen 410 depicts the second overlay member 66 of FIG. 10D together with the second side 64*b* of the base member 64 of FIG. 10F. Naturally, the images displayed on the display screen 410 are merely electronic versions of the mechanical device 60. Furthermore, it is understood that the display device 400 could be configured as a display screen embedded into a portion of a gaming table. Without limiting the disclosure, there may be one or more other display screen information 416 viewable on the screen display 410 including number of hands played, time and date, reward and/or marketing information, serial numbers and the like as is understood in the art. Without limiting the current disclosure, one example of such a display screen information (or label) 416 might be the "House Way Selections" label depicted on a portion of the display screen 410 of the display device 400 as shown in FIG. 10G.

Figure 10H:
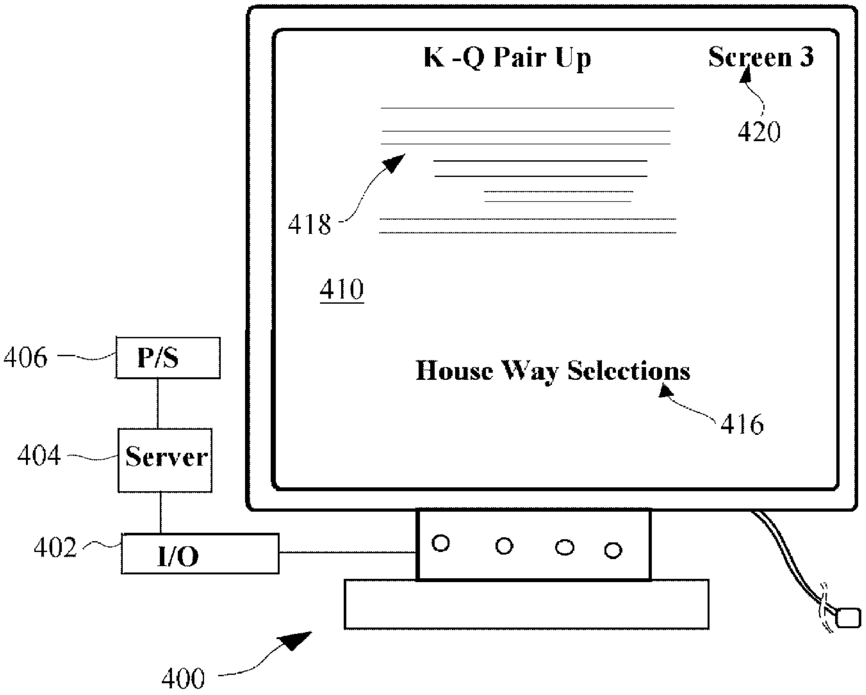
FIG. 10H is a front elevation view of a display device configured to show an indexed page of a House Way playing card arrangement on a portion of the display which is substantially similar to one aligned section of the mechanical device of FIG. 10.

In another embodiment of the display device 400, FIG. 10H, instead of showing aspects of images of the mechanical device 60 as described with respect to FIG. 10G above, another form of image may be displayed. Thus, as depicted on the display screen 410 of FIG. 10H in yet another front elevation view of the display device 400, one or more display indexed pages 418 obtained from a vectored address field and memory location field located within software and hardware of one or more server locations (such as the server 404 of a house way playing card arrangement 418 (or base member's specific sector) may be displayed on a portion of the screen display 410 through the input/output device 402. Naturally, this screen page (or display indexed page) 418 (numbered screen 3 as a display screen label 420 in FIG. 10H) may be substantially similar to one aligned sector of the mechanical device 60 of FIG. 10. As would be understood, and is known in the art, the display screen 410 coupled to hardware and software (not shown, but understood in the art) through an input/output device 404 may also include one or more payout tables (not shown, but described herein with reference to the methods of playing the Game) and any other information of relevance to the Game such as the name of the Game.

4. Gaming Devices Incorporating the Games

Figure 11:
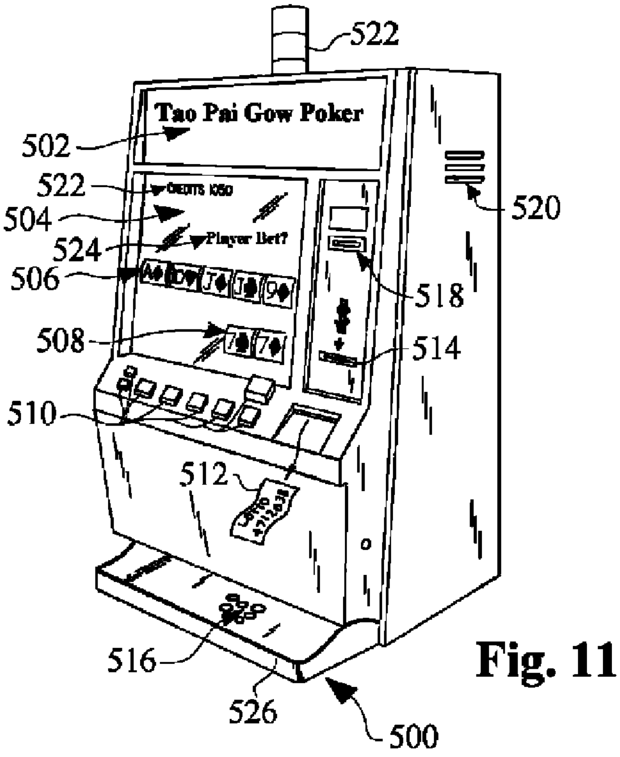
FIG. 11 depicts a front perspective view of a gaming machine configured to play the Game according to another embodiment of the invention.

FIG. 11 depicts a front perspective view of a gaming machine 500 configured to play the Game according to another embodiment of the invention. Thus, the gaming machine 500 comprises at least one display screen 502 that identifies the Game to the player, and may also display proprietary markings, marketing information and the like (not shown but understood in the art) as desired. Further, the gaming machine 500 may comprise a secondary display screen 504 that shows a player certain aspects of the Game, including playing cards that have been dealt arranged into a long side 506 and a short side 508 and credits 522, as well as other player-relevant information to make wagers 524 and/or process the playing cards 510. Without limiting the disclosure, other secondary display screen information may also be shown to the player by use of one or more buttons 510 or other pointing devices (not shown) that permit manipulation of the secondary display screen, such as touch screen devices programmed into the gaming machine 500 to respond to certain player actions (touching the screen with the player's finger or with a pointing device as is known in the art). Additionally, the gaming machine 500 may include audio features provided by an audio source (not shown) and one or more speakers 520 and means for receiving and paying out one or more credits through cash receptor 514 or voucher (ticket-in/ticket-out) receptor 512, and cash disburser 516 or voucher disburser 512, as is known in the art or may become known in the future, such as credit card processing receptor 518. This may also include programmable radio frequency identification devices (RFID) which have not been shown in FIG. 10H or any other means of transferring "currency" from the player to the gaming establishment or vice versa, as may be disclosed in the future. Additionally, the gaming machine 500 may have a signaling device 522 to visually alert gaming employees of the gaming establishment that the gaming machine has malfunctioned or that other services may be desired by the player. Without limiting the disclosure, the gaming machine may form part of a network of gaming machines as desired and known in the art.

Figure 11A:
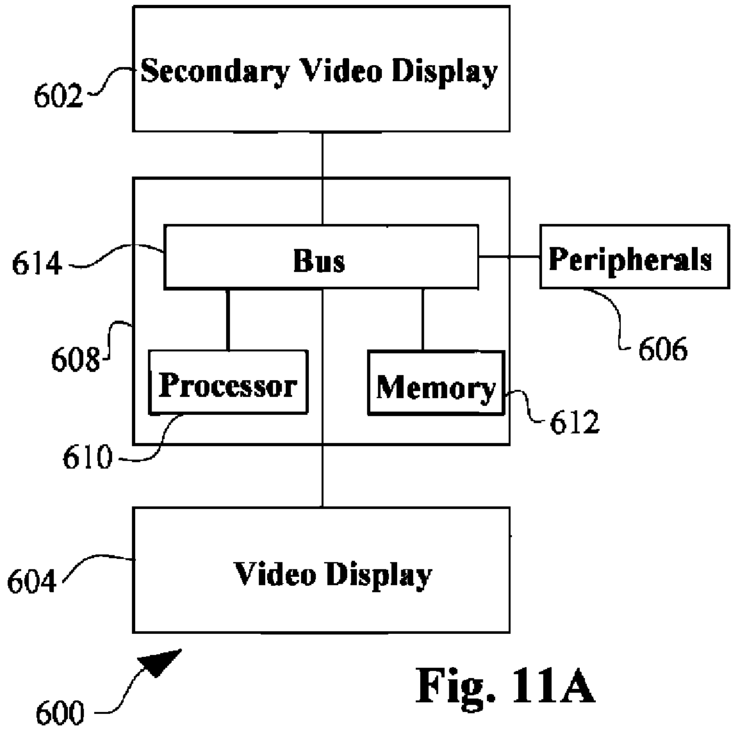
FIG. 11A depicts a schematic diagram of the gaming machine of FIG. 11 configured with a version of the Game.

FIG. 11A depicts a schematic diagram of some inner components 600 of the gaming machine 500 configured with one or more GAMES in a very simplified manner. Essentially, and without limiting the disclosure, the schematic diagram of inner components 600 generally depicts certain hardware components such as a primary display device board or chip 604 (video display) and a secondary display device board or chip (secondary video display) 602 in communication with other boards or chips and the like of a server system 608. Additionally one or more peripherals 606 may be in communication with the server system 608. The server system 608 may include one or more processors 610 such as one or more central processing units as is known in the computer art, one or more addressable memory units 612 that may be randomly accessible in a dynamic or a fixed fashion as desired, and means for communicating between the peripherals 606, the memory units 612 and the processors 610 through one or more buses 614 comprising wires and the like as is known in the art. Software components may be associated with certain sections of the gaming machine's schematic diagram 600, and may be programmed with any version of the Game into one or more memory chips (not shown) of the server system 608 or, alternatively, downloaded through various peripherals 606 (not shown) such as disk drives, USB drives, floppy drives, tape drives, paper tape drives and the like as are known in the art. Direct communication through an internet or an intranet specific to the gaming establishment download would be another way to program the gaming machine 500 using one or more peripherals 606 such as routers (not shown) and other known communication means whether hard-wired or wirelessly, such as through a server network, as desired. Such downloads could also be secured in any desirable fashion as is known in the art of encryption. Thus, information transfer could readily be achieved. Without limiting the disclosure, the elements shown in FIG. 11A may be applicable to any simple gaming device such as a hand-held wireless telephone, a computer and the like as is known in the art, so that the Game can be offered through communication devices including wireless mobile devices such as telephones, for-profit gaming devices, for-entertainment gaming devices or for-learning gaming devices as would be desired and known in the art.

5. Networking and Tournament Play

Figure 12A:
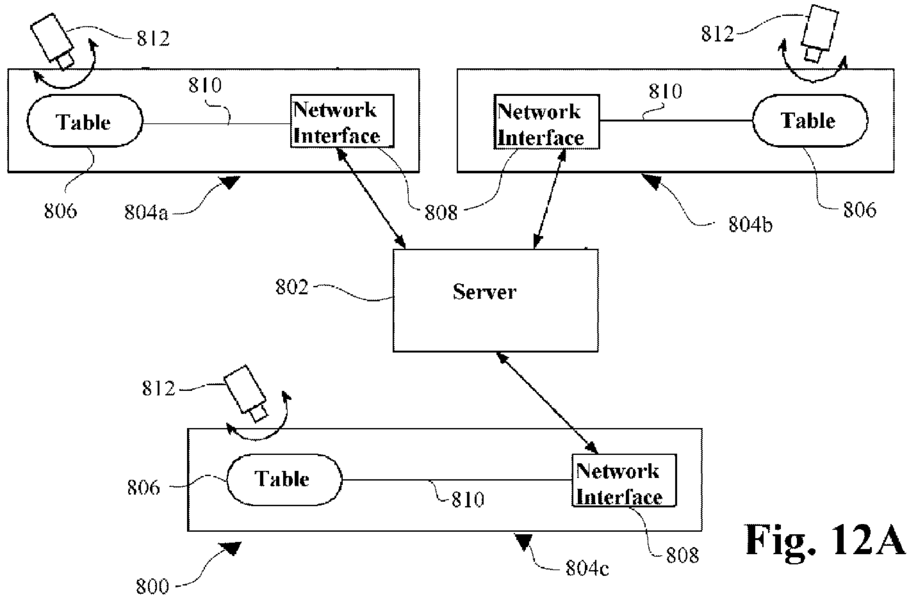
FIG. 12A depicts a network system of gaming tables having a version of the Game configured for tournament play according to another embodiment of the invention.

FIG. 12A depicts a network system 800 comprising one or more Game assemblies 804*a*, 804*b*, 804*c* in communication with at least one server 802. Each Game assembly 804*a*, 804*b*, 804*c* comprises one or more gaming tables 806 (one only shown per Game assembly) having at least one version of the Game configured for tournament play according to another embodiment of the invention. Each Game assembly 804*a*, 804*b*, 804*c* also has at least one network interface 808 in communication with each local gaming table 806. As depicted in FIG. 12A, for each Game assembly 804*a*, 804*b*, 804*c*, a communication channel 810 couples the gaming table 806 to the network interface 808 and the network interface communicates with the server 802. Additionally, a camera 812 may monitor playing action as a matter of security and possibly to broadcast each Game of each Game assembly 804*a*, 804*b*, 804*c*. Thus in a tournament play, the server 802 may be in communication with one or more remote displays (not shown) and could, for example, be used to either note when security breaches occur to alert gaming staff about such breaches of security, thereby obviating the need for a supervisor at each Game assembly 804*a*, 804*b*, 804*c*.

Further, the one or more remote displays could be configured as a pay-per-view event on a television network or as a general television broadcast. As is understood, the tournament play arrangement described above could be configured in any kind of entertainment or educational environment such as a game offered between computer players.

Figure 12B:
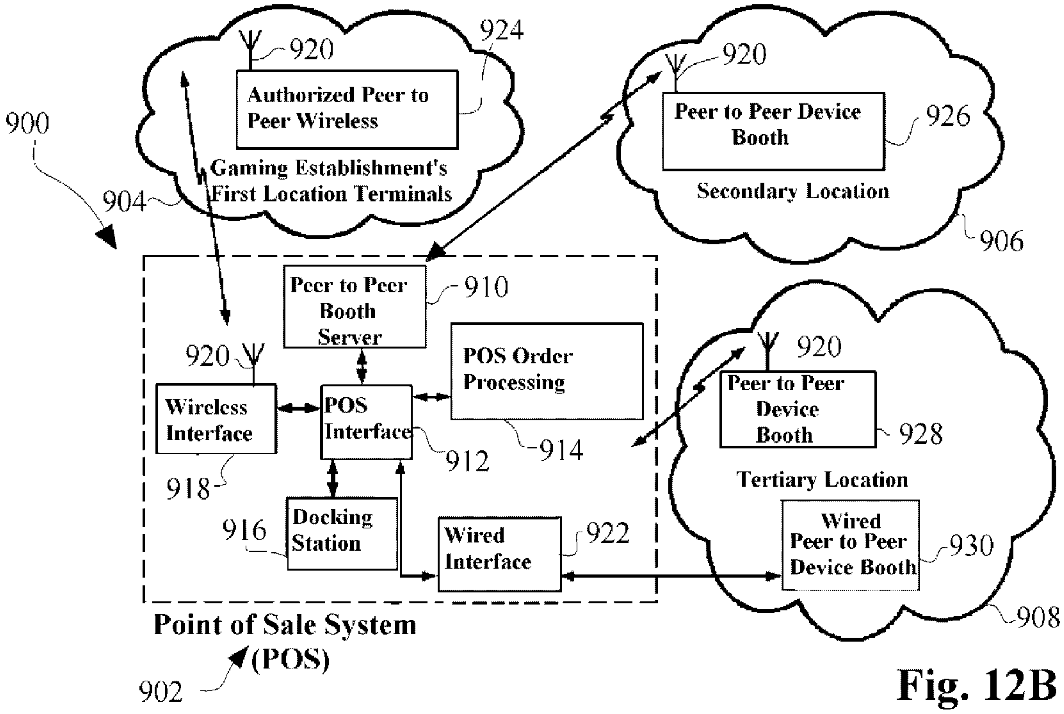
FIG. 12B depicts a schematic diagram for playing one or more versions of the Games remotely within a gaming establishment according to another embodiment of the invention.

FIG. 12B depicts a schematic diagram for a Game system 900 permitting play of the Game remotely within a gaming establishment according to another embodiment of the invention. As depicted in FIG. 12B, the Game system 900 comprises a point-of-sale system (POS system) 902 which would be somewhat similar to conventional POS systems as used in the restaurant and other service industries that deal with the public and need to keep track of client orders plus keep track of financial matters in a secure environment. This substantially describes the environment of many gaming establishments that have elements of being banks and also of being service providers while offering opportunities to customers.

Turning back to FIG. 12B, as configured for a gaming establishment, the POS system 902 may comprise a peer-to-peer server 910 located in a booth recognizable by players in a gaming establishment. The peer-to-peer server 910 may be in communication with a POS interface 912 to process (POS order processing 914) and send and receive coded (encrypted) remote instructions using one or more routers (not shown) as understood in the art. The POS interface 912 may be in further communication with a docking station 916, where hand-held gaming devices (not shown) might be charged and reprogrammed as desired through software located in the peer-to-peer server 910 through the POS interface 912. Such reprogramming may be accomplished merely by downloading information into SIMS located within the hand-held devices or through flash reprogramming of firmware located in the hand-held devices as is understood in the computer art. Communication to one or more gaming establishment locations 904, 906, 908 (only three shown) may be accomplished wirelessly using one or more wireless antennae 920 located in both the POS system and, of course, associated with the hand-held devices or other booths located throughout the gaming establishment. Since such communication has many of the same features as cell phones, the wireless communication system being used may form part of an intranet configured and secured by the gaming establishment. Of course, many more than only three gaming establishment locations could easily be associated with the POS system 902. In yet another aspect, communications may be by way of cable terminals (hard-wired) via a wire interface 922 which forms a portion of the POS system 902.

Looking further at FIG. 12B it may be seen that the POS system 902 may communicate with either an authorized peer-to-peer wireless interface 924 and a location's hard-wired terminals at the first gaming establishment location 904. Alternatively, for the secondary gaming establishment location 906, there may be a wireless peer-to-peer device booth 926 where players could receive hand-held devices and/or play the Game as desired. Further, for the tertiary (or third) gaming establishment location 908 there may be a wireless peer-to-peer device booth 928 where players could receive hand-held devices and/or play the Game as desired as described for the secondary gaming establishment location 906 above. However, the tertiary (or third) gaming establishment location 908 may also provide a wired peer-to-peer device booth 930 having one or more secure terminals in communication with the POS system 902, as would be understood in the art of secure communication devices associated with hard-wired secure communications.

The Game disclosed herein may be offered in an Internet-style context. This could be offered in either a wagering or non-wagering environment as desired using networked conferencing through web cameras linked to fast personal computers or other mobile communication devices on a live basis using streaming video. In another embodiment, this could be offered in a wagering or non-wagering context as desired using networked conferencing through virtual representations of the house and players using pop-up images, streaming video or other video technologies as known in the existing art or as shall become known in the future. The Game may be offered over the Internet in secure transactions by way of digital rights management software. As described herein, it may be readily appreciated that those features regarding tournament play (see above) using servers and video devices coupled to gaming table layouts may be readily adapted to such Internet activity where players might use the equivalent of the POS system described above on their own computers or mobile communication devices to interface with a hosting site offering the Game. Without limiting the disclosure, the computers or mobile communication devices may be securely interfaced with one another and a house (hosting web-site) through secure Internet protocols and connections such as VPN (virtual private networks) to participate in one or more versions of the Game. In fact, because of the ability to perform efficient networked conferencing, players could readily play the Game while remaining anonymous, and with the hosting website performing the function of the dealer/banker representing a gaming establishment offering the Game as desired. Naturally, players participating in a wager-driven version of the Game would provide funding to participate. Such player funding could be represented as credit banks, and payouts would be made back to winning players through their credit banks. Such financial activities could be displayed to players as desired and incorporated in one or more appropriate secured software programs interfacing with players' displays and input/output terminals in a manner similar to the activities described earlier (see above).

Without limiting the disclosure, the Game may be configured for play in multiple forms and media including, but not limited to, single-player slot video machines, multi-player slot video machines, electronic games and devices, mobile telephone devices, lottery terminals, software as well as in-flight, home, and Internet entertainment. In addition, the Game can be readily implemented in any computer program peripheral (e.g., floppy disk, compact disc (CD), SIM card, USB device, etc.) comprising a computer readable medium having control logic located on one or more readable chips recorded therein to implement the features herein as described in relation to the multiple embodiments of the Game. As depicted above, the control logic may be loaded into the memory of a computer and executed by one or more central processing units (CPU) to perform one or more operational steps embodied in these products with clear advantages to one or more entities offering one or more versions of the Game.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of playing a modified pai gow poker game on a computerized platform, the computerized platform comprising a display operatively associated with a processor, a data input interface that actuates visual representations on the display, and a computer readable medium encoded with instructions and executed by the processor to perform the steps of:

dealing on the display at least one card hand selected from the group of card hands consisting of five cards, six cards, seven cards and eight cards from a standard poker card deck of playing cards including a wild card to each of the one or more players and a dealer during the round of play;

evaluating a dealer's card hand to determine whether said dealer's card hand comprises a dealer's pai gow hand having no poker elements other than the value of individual singleton cards;

identifying a highest value card of said dealer's pai gow hand;

providing a push condition having a preselected card value comprising a single card selected from the group of single cards consisting of ace, king, queen, jack, ten and nine;

comparing the highest value card of the dealer's card hand with the push condition to determine if the highest value card of the dealer's card hand is of the same value as the preselected card value; and settling said round of play as a tie if the push condition is satisfied.

2. The method of claim 1 wherein said preselected card value comprises at least one card of a contiguous range of cards selected from the group consisting of ace or lower, king or lower, queen or lower, jack or lower and ten or lower.

3. The method of claim 1, wherein said preselected card value comprises at least one card of a non-contiguous combination of cards selected from the group of cards consisting of ace or queen, ace or jack, ace or ten, ace or nine, king or jack, king or ten, king or nine, queen or ten, queen or nine, jack or nine, jack or eight, ace or queen or jack, ace or queen or ten, ace or jack or ten, ace or jack or nine, ace or ten or nine, ace or ten or eight, ace or nine or seven, king or jack or ten, king or jack or nine, king or ten or nine, king or ten or eight, king or nine or seven, queen or ten or nine, queen or ten or eight, queen or nine or eight, queen or nine or seven, jack or nine or eight, jack or nine or seven, and jack or eight or seven.

4. The method of claim 1, wherein said preselected card value comprises at least one card of a non-contiguous combination of single cards and a contiguous range of cards selected from the group of cards consisting of ace or queen or jack or lower, ace or jack or ten or lower, ace or ten or nine or lower, king or jack or ten or lower, king or ten or nine or lower, queen or ten or nine or lower, and jack or nine or eight or lower.

5. The method of claim 1, wherein at least one of said one or more players acts as a banker.

6. The method of playing the modified pai gow poker game of claim 1, further comprising the steps of:

offering one or more proposition wagers as follows:

(a) a bonus wager independent of said main wager, wherein a player achieves a three-of-a-kind or higher ranking card hand;

(b) a protection wager independent of said main wager, wherein a player achieves a pai gow hand or an A-5 natural straight flush;

(c) a wager that the dealer will push all main bets on a dealer's queen-high pai gow card hand when a main bet on a 20 dealer's queen-high pai gow hand is pushed; and (d) a wager that the dealer will push all main bets on a dealer's jack-high or lower pai gow card hand when a main bet on a dealer's jack-high or lower pai gow hand is pushed.

7. The method of playing the modified pai gow poker game of claim 6, further comprising the steps of:

in a seven-card hand version of said pai gow poker game, awarding one or more payouts to a player as follows:

(a) for said bonus wager at least one of the following: 120:1 on achieving an ace through a five-card natural straight flush and not having a suited A-Q as the two remaining cards of the hand; 1,000:1 on achieving a royal flush where the two remaining cards of the hand are a suited A-Q; and other payouts according to Table 9 herein;

(b) for said protection wager at least one of the following: a payout of 25:1 on achieving a ten-high pai gow hand; 3:1 on achieving an ace-high pai gow hand; and other payouts according to Table 10 herein;

(c) for said queen-high pai gow hand, a 45:1 payout on achieving the requirements of said wager;

(d) for jack-high or lower pai gow card hand, a 100:1 payout on achieving the requirements of said wager.

8. The method according to claim 1 wherein each of a player's card hand and a dealer's card hand comprises at least one of the following:

eight playing cards subdivided into a five-card long side and a three-card short side, seven playing cards subdivided into a five-card long side and a two-card short side, six playing cards subdivided into a four-card long side and a two-card short side, six playing cards subdivided into a three-card long side and a three-card short side, and five playing cards subdivided into a three-card long side and a two-card short side.

9. A method of hosting a modified pai gow poker game on a computerized platform, the computerized platform comprising a display operatively associated with a processor, a data input interface that actuates visual representations on the display, and a computer readable medium encoded with instructions and executed by the processor to perform the steps of:

receiving a wager from a player to participate in a round of play;

dealing onto the display a hand of playing cards selected from the group of card hands consisting of five cards, six cards, seven cards and eight cards from a standard poker card deck of playing cards to form a player's hand and a dealer's hand in the round of play;

determining if the dealer's hand comprises a dealer's pai gow hand, wherein a dealer's pai gow hand is a hand of cards having no poker ranking other than the value of an individual singleton card;

identifying a highest value card among the cards forming the dealer's hand if the dealer's hand is determined to be a dealer's pai gow hand;

comparing the highest value card of the dealer's card hand with a preselected card value comprising a single card selected from the group of single cards consisting of ace, king, queen, jack, ten and nine; and settling the wager if the highest value card of the dealer's card hand is of the same value as the preselected card value, wherein the entire wager is not won or lost.

* * * * *